United States Patent
Zhou et al.

(10) Patent No.: US 12,028,931 B2
(45) Date of Patent: Jul. 2, 2024

(54) EVENT MONITORING METHOD AND APPARATUS

(71) Applicant: HUAWEI TECHNOLOGIES CO., LTD., Guangdong (CN)

(72) Inventors: Xiaoyun Zhou, Nanjing (CN); Yali Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 17/404,218

(22) Filed: Aug. 17, 2021

(65) Prior Publication Data

US 2021/0377721 A1 Dec. 2, 2021

Related U.S. Application Data

(63) Continuation of application No. PCT/CN2020/075877, filed on Feb. 19, 2020.

(30) Foreign Application Priority Data

Feb. 19, 2019 (CN) .......................... 201910124749.X

(51) Int. Cl.
*H04W 8/12* (2009.01)
*H04W 8/24* (2009.01)
(Continued)

(52) U.S. Cl.
CPC ............... *H04W 8/12* (2013.01); *H04W 8/24* (2013.01); *H04W 24/08* (2013.01); *H04W 48/04* (2013.01); *H04W 60/06* (2013.01); *H04W 64/003* (2013.01)

(58) Field of Classification Search
CPC ................................................. H04W 4/50–80
See application file for complete search history.

(56) References Cited

U.S. PATENT DOCUMENTS

2011/0026484 A1   2/2011   Fox et al.
2011/0105153 A1   5/2011   Mikl et al.
(Continued)

FOREIGN PATENT DOCUMENTS

CN   101500287 A   8/2009
CN   101595752 A   12/2009
(Continued)

OTHER PUBLICATIONS

3GPP TS 23.682 V16.1.0:"3rd Generation Partnership Project;Technical Specification Group Services and System Aspects;Architecture enhancements to facilitate communicationswith packet data networks and applications(Release 16)",Dec. 2018,total 126 pages.
(Continued)

*Primary Examiner* — San Htun
(74) *Attorney, Agent, or Firm* — HUAWEI TECHNOLOGIES CO., LTD.

(57) ABSTRACT

In a location reporting notification method regarding user equipment (UE) moving from an area served by a first mobility management network element (MMNE) to another area served by a second MMNE, the second MMNE receives from the first MMNE a current value of a first timer regarding the UE, wherein the first timer is maintained by the first MMNE. The second MMNE starts a second timer regarding the UE, and setting an initial value of the second timer to be the current value of the first timer. When the second MMNE detects a current location of the UE, it sends a reporting notification including information regarding the current location to a service capability exposure function when the second timer expires.

18 Claims, 14 Drawing Sheets

(51) Int. Cl.
　　　*H04W 24/08*　　(2009.01)
　　　*H04W 24/10*　　(2009.01)
　　　*H04W 48/04*　　(2009.01)
　　　*H04W 60/06*　　(2009.01)
　　　*H04W 64/00*　　(2009.01)

(56) References Cited

U.S. PATENT DOCUMENTS

| | | | | |
|---|---|---|---|---|
| 2011/0116477 A1* | 5/2011 | Wu | H04W 12/08 |
| | | | 370/331 |
| 2016/0337841 A1* | 11/2016 | Won | H04W 8/04 |
| 2017/0188280 A1* | 6/2017 | Watfa | H04W 36/12 |
| 2018/0020369 A1* | 1/2018 | Parra | H04W 40/28 |
| 2018/0098279 A1* | 4/2018 | Edge | H04W 4/70 |
| 2018/0234885 A1* | 8/2018 | Rink | H04W 72/51 |

FOREIGN PATENT DOCUMENTS

| | | |
|---|---|---|
| CN | 101981986 A | 2/2011 |
| CN | 104604289 A | 5/2015 |

OTHER PUBLICATIONS

Huawei et al., "Correction to the location reporting with minimum reporting interval",3GPP TSG-SA2 Meeting #131 S2-1901856,Feb. 1-Mar. 1, 2019, Santa Cruz—Tenerife, Spain,Total 2 Pages.

3GPP TS 23.060 V15.5.0 (Dec. 2018)3rd Generation Partnership Project;Technical Specification Group Services and System Aspects;General Packet Radio Service (GPRS);Service description;Stage 2(Release 15),total 367 pages.

Huawei et al., "Correction to the location reporting with minimum reporting interval", 3GPP TSG-SA2 Meeting #131 62-1901855,Feb. 25-Mar. 1, 2019, Santa Cruz—Tenerife , Spain,Total 2 Pages.

3GPP TS 23.401 V16.3.0 (Jun. 2019)3rd Generation Partnership Project;Technical Specification Group Services and System Aspects;General Packet Radio Service (GPRS) enhancements for Evolved Universal Terrestrial Radio Access Network (E-UTRAN) access(Release 16),total 422 pages.

3GPP TS 23.682 V16.3.0 3rd Generation Partnership Project;Technical Specification Group Services and System Aspects;Architecture enhancements to facilitate communications with packet data networks and applications(Release 16) Sep. 2019 total 132 pages.

3GPP TS 29.272 V15.8.0 (Jun. 2019)3rd Generation Partnership Project;Technical Specification Group Core Network and Terminals;Evolved Packet System (EPS);Mobility Management Entity (MME) and Serving GPRS Support Node (SGSN) related interfaces based on Diameter protocol(Release 15),total 179 pages.

* cited by examiner

EVENT MONITORING METHOD AND APPARATUS

CROSS-REFERENCE TO RELATED APPLICATION

This application is a continuation of International Application No. PCT/CN2020/075877, filed on Feb. 19, 2020, which claims priority to Chinese Patent Application No. 201910124749.X, filed on Feb. 19, 2019. The disclosures of the aforementioned priority applications are hereby incorporated by reference in their entirety.

TECHNICAL FIELD

The present invention relates to the field of wireless communications technologies, and in particular, to an event monitoring method and apparatus.

BACKGROUND

The 3rd Generation Partnership Project (3rd generation partnership project, 3GPP) defines a service capability exposure (service capability exposure, SCE) architecture that can be applied to 4G and 5G networks. FIG. 1 is an architectural diagram of service capability exposure on the 4G network. Based on the architecture, a 3GPP network can securely provide a service capability to service capability server/application server (Service Capability Server/Application Server, SCS/AS) of a third-party service provider. A service capability exposure function (Service Capability Exposure Function, SCEF) network element is a core network element in the architecture, and allows the 3GPP network to securely provide the service capability for the SCS/AS of the third-party service provider. A home subscriber server (Home Subscriber Server, HSS) is a home user subscription server that stores subscription information of a user. A mobility management entity (Mobility Management Entity, MME) and a serving GPRS support node (Serving GPRS Support Node, SGSN) are network elements responsible for performing mobility management on user equipment (User Equipment, UE). The SCS/AS invokes, by using a T8 application programming interface (Application Programming Interface, API), a service capability provided by the SCEF. FIG. 2 is an architectural diagram of service capability exposure on the 5G network. A 5G system is a service-based architecture, and a network exposure function network element (Network Exposure Function, NEF) performs a function similar to a function of an SCEF on the 4G network. An Nnef interface is used to develop services and capabilities supported by the 3GPP network for the SCS/AS, and the Nnef interface is a service-based interface presented by the NEF. A unified data management node (Unified Data Management, UDM) performs a function similar to a function of an HSS on the 4G network, which provides supported service capabilities for the NEF through an Nudm interface. The Nudm interface is a service-based interface presented by the UDM. A core access and mobility management function network element (Core Access and Mobility Management Function, AMF) performs a function similar to a function of an MME on the 4G network, which provides the supported services and capabilities for the NEF through the Namf interface. The Namf interface is a service-based interface presented by the AMF.

In the preceding service capability exposure architecture, the SCS/AS can perform event monitoring (Event Monitoring) on the UE. A plurality of events of the UE can be monitored, such as location reporting.

During monitoring of a location reporting event, the SCS/AS sends a monitoring request message to the SCEF/NEF, where the monitoring request message indicates to-be-monitored UE and a minimum reporting interval (Minimum Reporting Interval, MRI), and the MRI is used to indicate a minimum time interval between location reporting indications. If the MRI is provided to the MME/SGSN/AMF, the MME/SGSN/AMF monitors an event based on a monitoring event parameter delivered by the HHS/UDM, and starts a timer with a value set to the MRI. Before the timer expires, namely, running duration of the timer does not exceed the MRI, the MME/SGSN/AMF withholds a location reporting notification of a detected UE location. When the timer expires, namely, when the running duration of the timer reaches the MRI, the MME/SGSN/AMF sends a latest withheld location reporting notification.

When the UE moves between MMEs/SGSNs/AMFs, a new MME/SGSN/AMF to which the UE moves resets a timer based on the MRI. Therefore, an interval between two location reporting notifications of the UE may exceed the MRI. In extreme cases, a UE location changes for a plurality of times, and an interval between two adjacent location changes does not exceed the MRI. In this case, the MME/SGSN/AMF does not send a location reporting notification. As a result, the SCS/AS cannot monitor a location update of the UE in time.

SUMMARY

Embodiments of this application provide an event monitoring method and apparatus, to avoid an excessively long time interval between two location reporting notifications of UE in the prior art, and ensure that an SCS/AS can monitor a location update of the UE in time.

According to a first aspect, an event monitoring method is provided, including the following process:

in a mobility management network element reselection process, a first mobility management network element determines a first duration value, and sends the first duration value to a second mobility management network element, where the first duration value is a current value of a first timer corresponding to user equipment UE maintained by the first mobility management network element, and before the first timer expires, the first mobility management network element usually withholds sending of a location reporting notification of the UE; and the second mobility management network element receives the first duration value sent by the first mobility management network element, starts a second timer corresponding to the UE and maintained by the second mobility management network element, and sets an initial value of the second timer based on the first duration value; and the second mobility management network element sends a withheld location reporting notification of the UE when the second timer expires.

In the mobility management network element reselection process, assuming that the UE moves from the first mobility management network element to the second mobility management network element, the first mobility management network element sends the current value of the first timer corresponding to the UE maintained by the first mobility management network element as the first duration value to the second mobility management network element. The second mobility management network element receives the first duration value, and sets the initial value of the second timer corresponding to the UE maintained by the second mobility management network element. This ensures that the second mobility management network element continues timing on a basis that the first mobility management network element has performed timing, instead of resetting a timer for re-timing. When determining that the second timer expires, the second mobility management network element sends the withheld location reporting notification of the UE, and an interval between two location reporting notifications of the UE is not excessively long. This ensures that an SCS/AS can monitor a location update of the UE in time.

In a possible implementation, before the second timer expires, the second mobility management network element may withhold sending of the location reporting notification of the UE. Before the second timer expires, the location reporting notification of the UE is withheld. This prevents a network from being affected by signaling load caused by frequent triggering of a location reporting notification when a location update of the UE frequently occurs.

In a possible implementation, when the second timer expires, if there is at least one withheld location reporting notification of the UE, the second mobility management network element may send a latest location reporting notification in the withheld location reporting notification of the UE. When the second timer expires, the second mobility management network element reports the latest location reporting notification in the withheld location reporting notification of the UE. This ensures that location information of the UE detected by the SCS/AS is current location information of the UE, and ensures accuracy of the location update of the UE monitored by the SCS/AS.

In a possible implementation, before the first mobility management network element determines the first duration value, the first mobility management network element may further receive a minimum reporting interval sent by a user data management network element, where the minimum reporting interval is a minimum time interval between two or more location reporting notifications; and the first mobility management network element starts the first timer, and sets an initial value of the first timer based on the minimum reporting interval. The first mobility management network element is a mobility management network element before the UE moves. When setting the first timer corresponding to the UE, the first mobility management network element may set the first timer based on the minimum reporting interval sent by the user data management network element.

In a possible implementation, before the first timer expires, the first mobility management network element may further withhold the location reporting notification of the UE. Similarly, before the first timer expires, the location reporting notification of the UE is withheld. This prevents the network from being affected by the signaling load caused by frequent triggering of the location reporting notification when the location update of the UE frequently occurs.

In a possible implementation, when the first timer expires, the first mobility management network element may further send the location reporting notification of the UE.

In a possible implementation, when the first timer expires, if there is at least one withheld location reporting notification of the UE, the first mobility management network element may further send the latest location reporting notification in the withheld location reporting notification of the UE, restarts the first timer, and sets the initial value based on the minimum reporting interval.

When the first timer expires, the latest location reporting notification in the withheld location reporting notification of the UE is sent. This ensures that the location information of UE detected by the SCS/AS is the current location information of the UE, and the first timer is restarted and reset to continue to perform event monitoring, so that when a reset first timer expires, reporting of a location reporting notification of the UE can be continued.

In a possible implementation, after sending the latest location reporting notification in the withheld location reporting notification of the UE, the first mobility management network element may further save location information of the UE in the latest location reporting notification as latest reported location information of the UE.

In a possible implementation, the first mobility management network element may further send the latest reported location information of the UE to the second mobility management network element; and the second mobility management network element receives the latest reported location information of the UE saved and sent by the first mobility management network element. By saving and/or sending the latest reported location information of the UE, the mobility management network element may learn of the latest reported location information of the UE.

In a possible implementation, before sending the withheld location reporting notification of the UE, the second mobility management network element may further determine that the current location information of the UE is different from the latest reported location information of the UE. Alternatively, before sending the withheld location reporting notification of the UE, the first mobility management network element may further determine that the current location information of the UE is different from the latest reported location information of the UE.

When the timer expires, the mobility management network element determines that the current location information of the UE is different from the latest reported location information of the UE, and sends the withheld location reporting notification of the UE. This ensures that the SCS/AS can learn of the location update of the UE in time.

In a possible implementation, when the second timer expires and the current location information of the UE is the same as the latest reported location information of the UE, the second mobility management network element may further skip sending the location reporting notification of the UE.

When the first timer expires and the current location information of the UE is the same as the latest reported location information of the UE, the first mobility management network element may further skip sending the location reporting notification of the UE.

When the timer expires and the mobility management network element determines that the current location information of UE is the same as the latest reported location information of the UE, if a location reporting notification of the UE is not sent, it is avoided that a same meaningless location reporting notification is sent to the SCS/AS when the current location information of the UE is the same as the latest reported location information of the UE, to save network resources.

In a possible implementation, before the second timer expires, the second mobility management network element may further generate the withheld location reporting notification of the UE when determining that the current location information of the UE is different from the latest reported location information of the UE.

Before the first timer expires, the first mobility management network element may further generate the withheld location reporting notification of the UE when determining that the current location information of the UE is different from the latest reported location information of the UE.

Before the timer expires, the mobility management network element generates a location reporting notification of the UE when the current location information of the UE is different from the latest reported location information of the UE. This ensures that the SCS/AS can learn of the location update of the UE in time. Generation of the location reporting notification of the UE is withheld when the current location information of UE is the same as the latest reported location information of the UE, to further save processing resources of the mobility management network element.

In a possible implementation, the second mobility management network element may further receive the minimum reporting interval sent by the user data management network element, where the minimum reporting interval is a minimum time interval between two or more location reporting notifications; and when the second timer expires, the second mobility management network element restarts the second timer, and sets the initial value of the second timer based on the minimum reporting interval.

When the second timer expires, the second mobility management network element may further start and restart the second timer based on the minimum reporting interval sent by the user data management network element, to continue to perform event monitoring, so that when the reset second timer expires, reporting of a location reporting notification of the UE can be continued.

In a possible implementation, after sending the latest location reporting notification in the withheld location reporting notification of the UE, the second mobility management network element may further save the location information of the UE in the latest location reporting notification as the latest reported location information of the UE.

In a possible implementation, the second mobility management network element or the first mobility management network element is any one of an MME, an SGSN, and an AMF.

According to a second aspect, an event monitoring apparatus is provided. The apparatus provided in this application has a function of implementing actions of the mobility management network element in the foregoing method aspect, and includes a corresponding means (means) configured to perform a step or a function described in the foregoing method aspect. The step or function may be implemented by using software, hardware (for example, a circuit), or a combination of hardware and software. The mobility management network element includes a first mobility management network element and/or a second mobility management network element.

In a possible design, the apparatus includes one or more processors and a communications unit. The one or more processors are configured to support the apparatus to perform the corresponding function of the mobility management network element in the foregoing method.

Optionally, the apparatus may further include one or more memories. The memory is configured to be coupled to the processor, and the memory stores a program instruction and/or data that are/is necessary for the apparatus. The one or more memories may be integrated with the processor, or may be disposed independent of the processor. This is not limited in this application.

In another possible design, the apparatus includes a transceiver, a processor, and a memory. The processor is configured to control the transceiver or an input/output circuit to receive and send a signal. The memory is configured to store a computer program. The processor is configured to run the computer program in the memory, to enable the apparatus to perform the method performed by the mobility management network element in any one of the first aspect or the possible implementations of the first aspect.

In a possible design, the apparatus includes one or more processors and a communications unit. The one or more processors are configured to support the apparatus to perform the corresponding function of the mobility management network element in the foregoing method.

Optionally, the apparatus may further include one or more memories. The memory is configured to be coupled to the processor, and the memory stores a program instruction and/or data that are/is necessary for the mobility management network element. The one or more memories may be integrated with the processor, or may be disposed independent of the processor. This is not limited in this application.

The apparatus may be located in a mobility management network element, or may be a mobility management network element.

In another possible design, the apparatus includes a transceiver, a processor, and a memory. The processor is configured to control the transceiver or an input/output circuit to receive and send a signal. The memory is configured to store a computer program. The processor is configured to run the computer program in the memory, to enable the apparatus to perform the method performed by the mobility management network element in any one of the first aspect or the possible implementations of the first aspect.

According to a third aspect, a computer-readable storage medium is provided, and is configured to store a computer program. The computer program includes an instruction used to perform the method in any one of the first aspect or the possible implementations of the first aspect.

According to a fourth aspect, a computer program product is provided. The computer program product includes computer program code. When the computer program code is run on a computer, the computer is enabled to perform the method in any one of the first aspect or the possible implementations of the first aspect.

DESCRIPTION OF EMBODIMENTS

Figure 1:
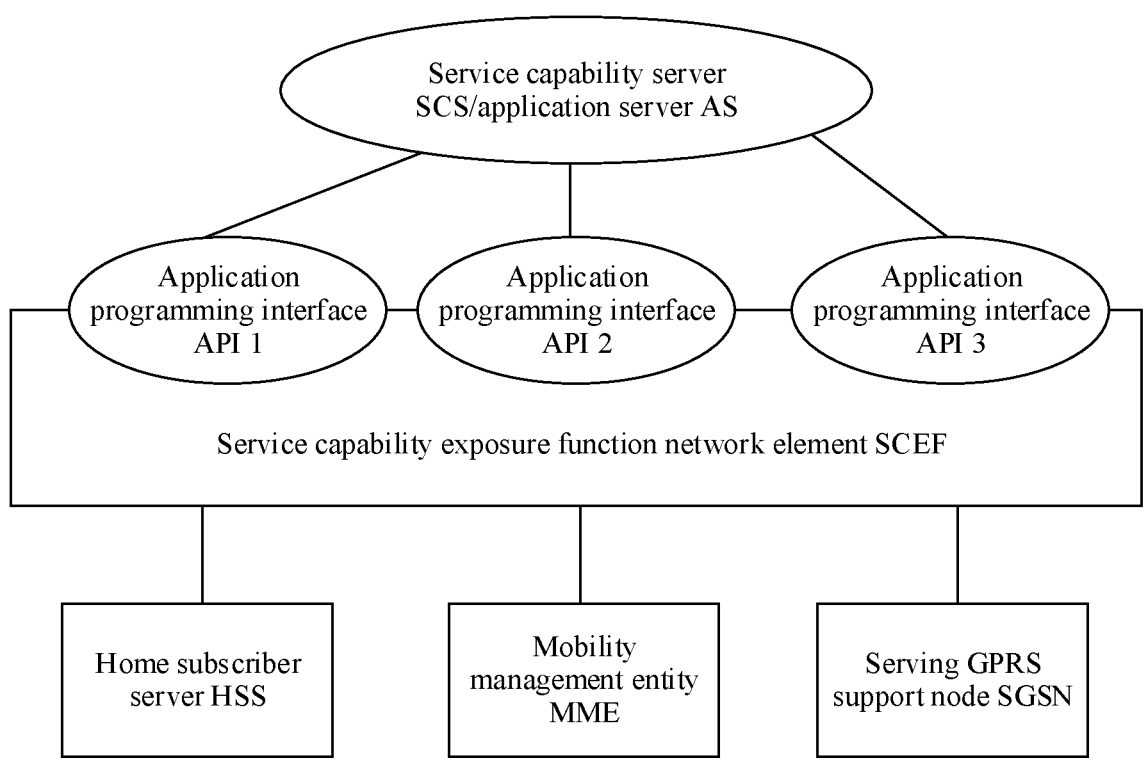
FIG. 1 is an architectural diagram of service capability exposure on a 4G network.
Figure 2:
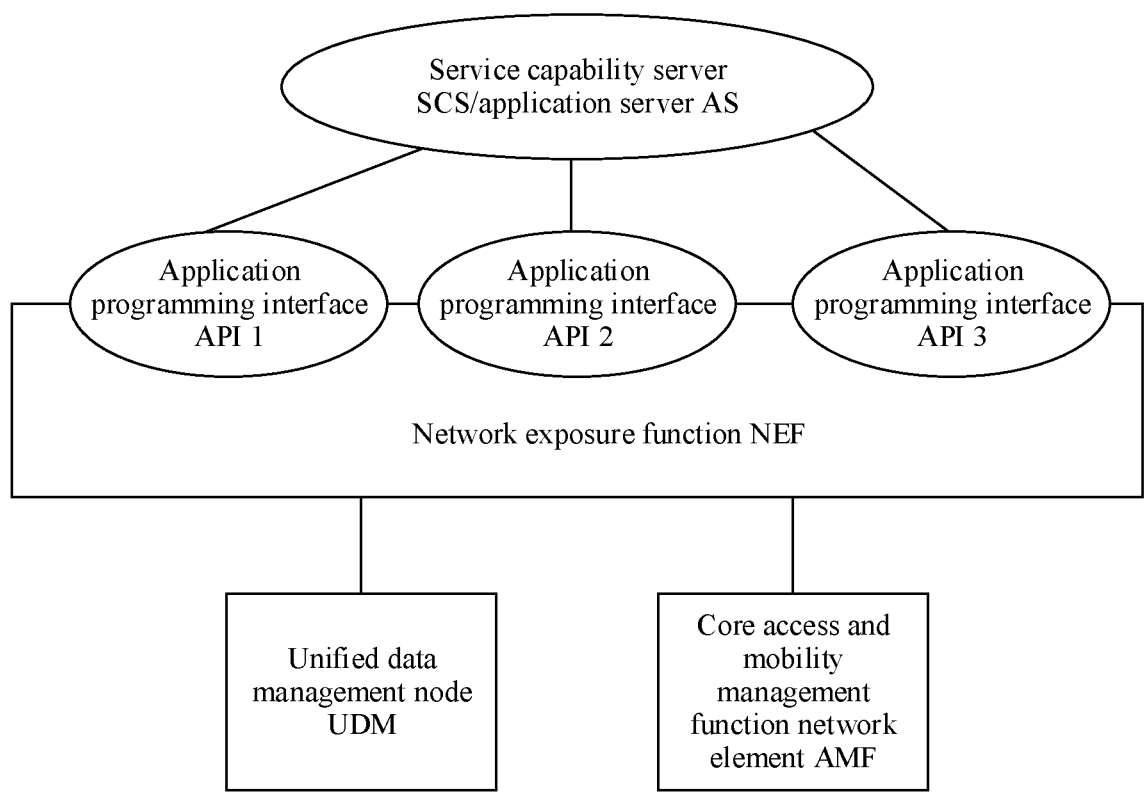
FIG. 2 is an architectural diagram of service capability exposure on a 5G network.

The following further describes the present invention in detail with reference to the accompanying drawings.

The technical solutions in the embodiments of this application may be applied to various communications systems, for example, a 4th generation (4th Generation, 4G) system, such as a long term evolution (long term evolution, LTE) system, a Worldwide Interoperability for Microwave Access (Worldwide Interoperability for Microwave Access, WiMAX) communications system, a future 5th generation (5th Generation, 5G) system, such as a new radio access technology (new radio access technology, NR), a future communications system, such as a 6G system, and the like.

This application presents aspects, embodiments, or features around a system that may include a plurality of devices, components, modules, or the like. It should be appreciated and understood that each system may include another device, component, module, and the like, and/or may not include all devices, components, modules, and the like discussed with reference to the accompanying drawings. In addition, a combination of these solutions may further be used.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems.

The following describes some terms in the embodiments of this application, to facilitate understanding of a person skilled in the art.

(1) User equipment (User Equipment, UE): can be connected to an electronic device on the Internet.

(2) Mobility management network element: is a network element responsible for performing mobility management on UE. On a 4G network, the mobility management network element includes a mobility management entity (Mobility Management Entity, MME) and a serving GPRS support node (Serving GPRS Support Node, SGSN). On a 5G network, the mobility management network element includes a core access and mobility management function network element (Core Access and Mobility Management Function, AMF).

(3) Timer: is maintained by a mobility management network element for UE. The mobility management network element withholds sending of a location reporting notification corresponding to the UE before the timer expires, and sends the location reporting notification corresponding to the UE when the timer expires, where the location reporting notification includes current location information of the UE.

(4) User data management network element: is responsible for managing user data and sending a minimum reporting interval to a mobility management network element, where the minimum reporting interval is a minimum time interval between two or more location reporting notifications. On a 4G network, the user data management network element includes a home subscriber server (Home Subscriber Server, HSS). On a 5G network, the user data management network element includes a unified data management node (Unified Data Management, UDM).

The term "and/or" in this application describes an association relationship between associated objects and represents that three relationships may exist. For example, A and/or B may represent the following three cases: Only A exists, both A and B exist, and only B exists. The character "/" generally indicates an "or" relationship between the associated objects.

In this application, "a plurality of" means two or more than two.

In addition, it should be understood that in descriptions of this application, terms such as "first" and "second" are merely used for differentiation and description, but should not be understood as an indication or implication of relative importance or an indication or implication of an order.

To facilitate understanding of the embodiments of this application, an application scenario used in this application is first described. A service capability server sends an event monitoring request through an exposure function network element, and the exposure function network element processes the event monitoring request and sends the event monitoring request to a user data management network element. The user data management network element processes the event monitoring request and sends the event monitoring request to a mobility management network element. The mobility management network element performs processing and monitors UE, and reports a monitored event reporting notification to the service capability server through the exposure function network element. In this way, the service capability server can perform event monitoring on the UE.

On 4G and 5G networks, the service capability server includes a service capability server/application server (Services Capability Server/Application Server, SCS/AS). On a 4G network, the exposure function network element includes a service capability exposure function network element (Service Capability Exposure Function, SCEF). On a 5G network, the exposure function network element includes a network exposure function network element (Network Exposure Function, NEF).

Figure 3:
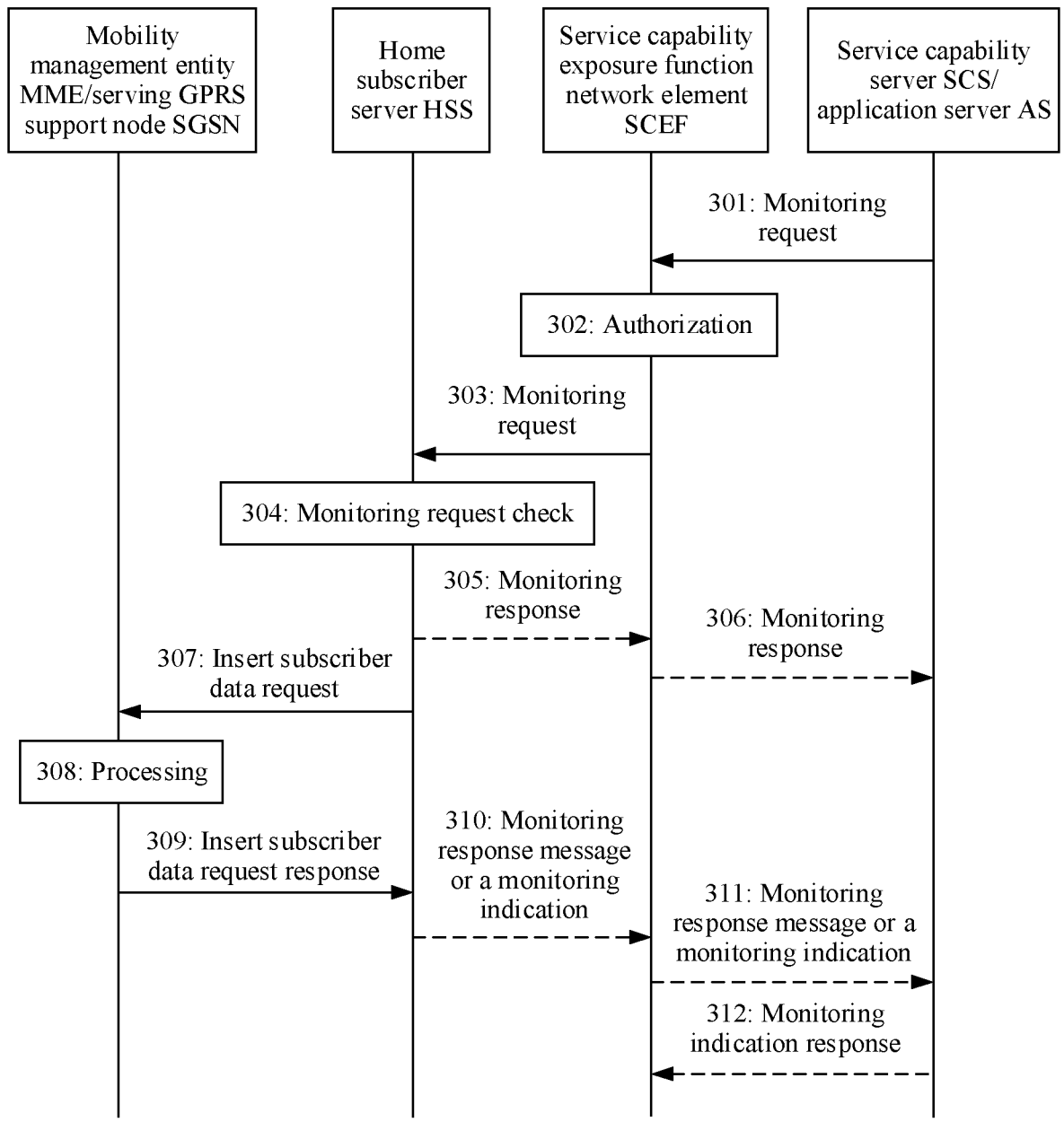
FIG. 3 is a schematic flowchart of event monitoring configuration on a 4G network.
Figure 4:
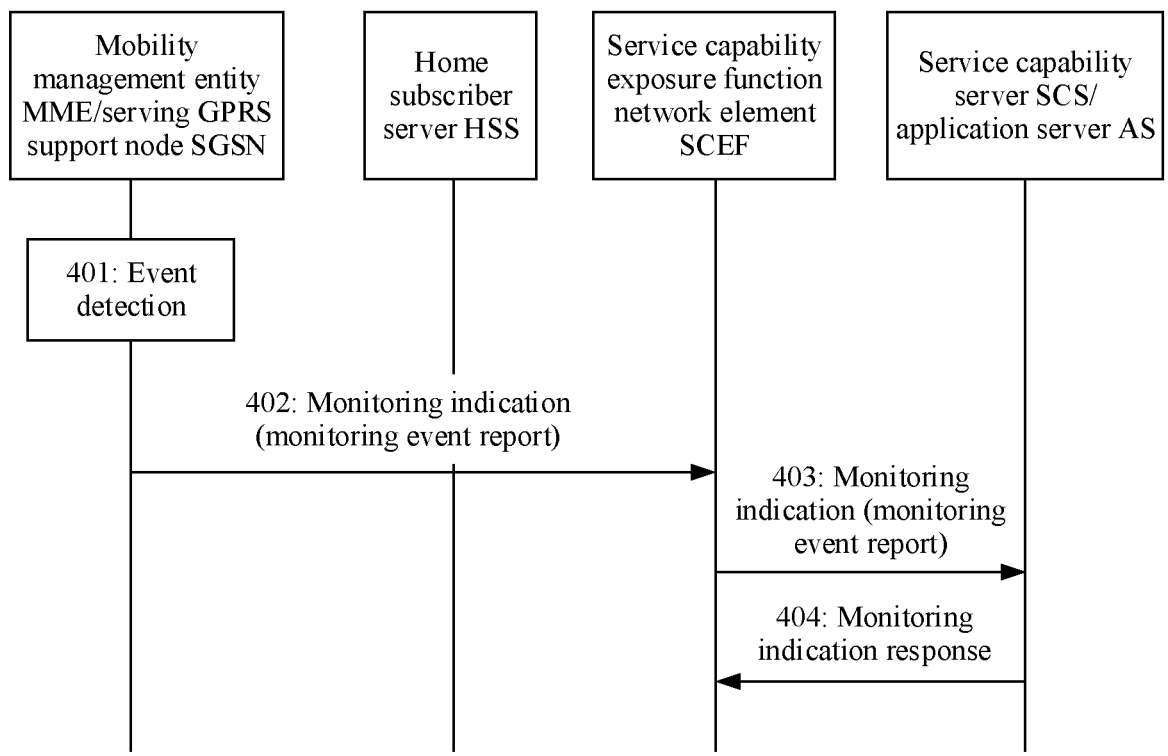
FIG. 4 is a schematic flowchart of event monitoring reporting on a 4G network.
Figure 5:
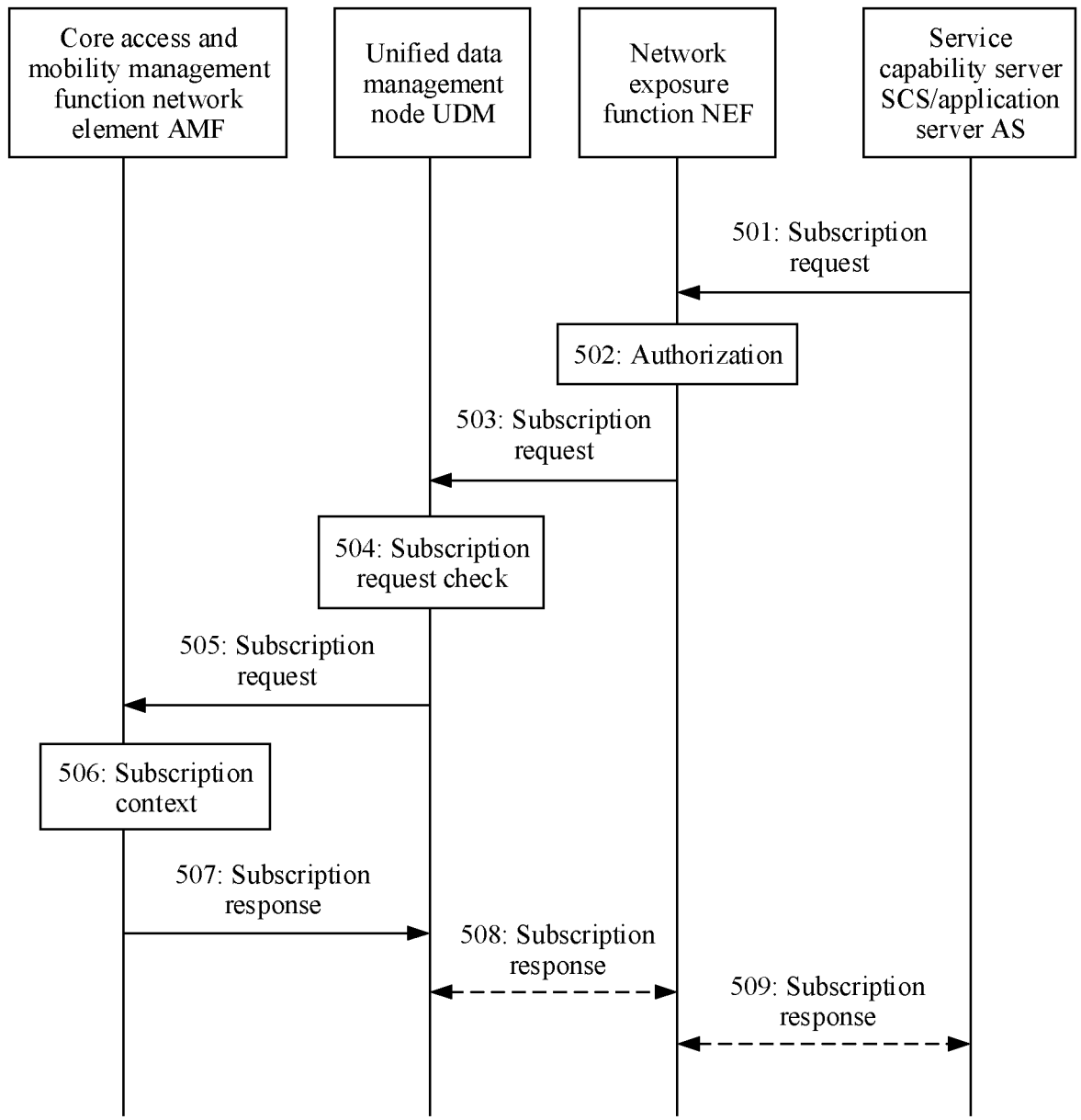
FIG. 5 is a schematic flowchart of event monitoring configuration on a 5G network.
Figure 6:
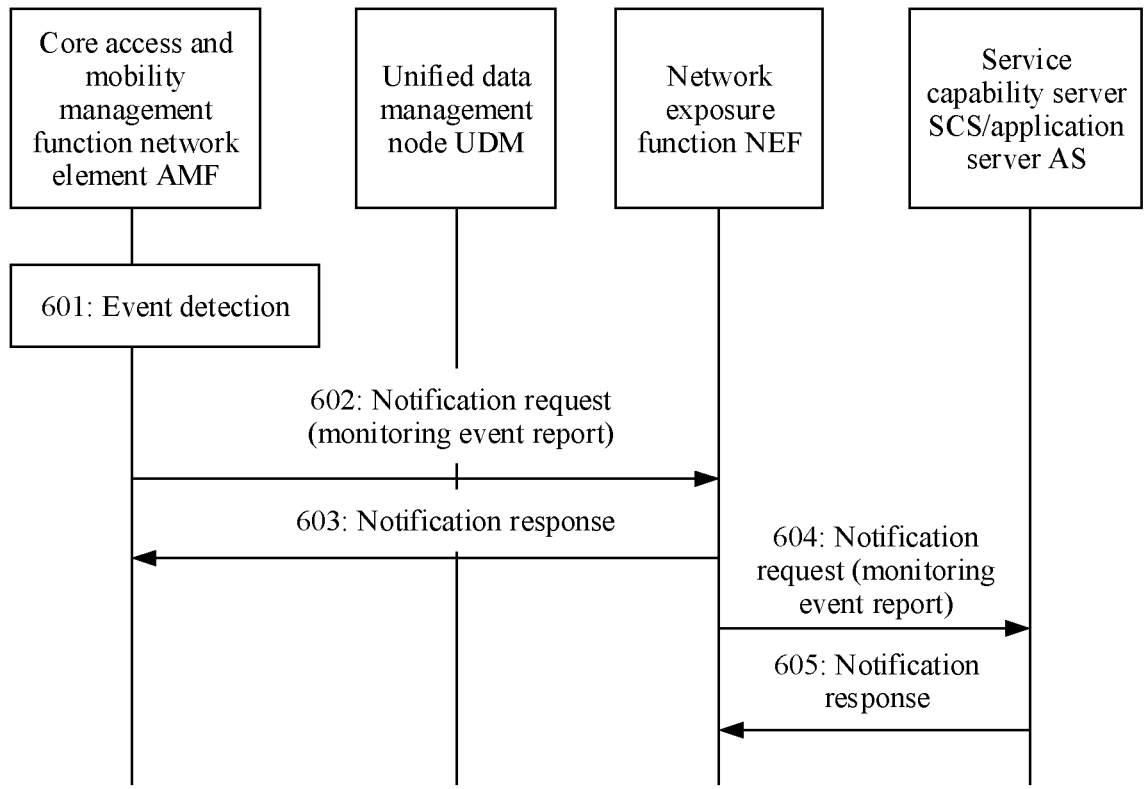
FIG. 6 is a schematic flowchart of event monitoring reporting on a 5G network.

To facilitate understanding of the embodiments of this application, a schematic flowchart of event monitoring configuration shown in FIG. 3 and a schematic flowchart of event monitoring reporting after configuration shown in FIG. 4 are still used as examples to describe in detail an application scenario of this application on a 4G network, a schematic flowchart of event monitoring configuration shown in FIG. 5 and a schematic flowchart of event monitoring reporting shown after configuration in FIG. 6 are used as examples to describe in detail an application scenario of this application on a 5G network. The processes shown in FIG. 3 and FIG. 4 are implemented based on the architecture shown in FIG. 1, and FIG. 4 is an event monitoring reporting process based on the event monitoring configuration process shown in FIG. 3. The processes shown in FIG. 5 and FIG. 6 are implemented based on the architecture shown in FIG.

2, and FIG. 6 is an event monitoring reporting process based on the event monitoring configuration process shown in FIG. 5.

First, refer to an event monitoring configuration process on a 4G network shown in FIG. 3. The configuration process includes the following steps.

Step 301: An SCS/AS sends a monitoring request message to an SCEF.

The monitoring request message carries an SCS/AS identifier, a T8 destination address, a monitoring type (Monitoring Type), and a mobile subscriber international ISDN/PSTN number (Mobile Subscriber International ISDN/PSTN number, MSISDN), or an external identifier (External ID) or an external group identifier (External Group ID).

If the SCS/AS requests to monitor location information of UE, the monitoring type is set to location reporting. When the monitoring type is set to location reporting, the monitoring request message further carries a minimum reporting interval (Minimum Reporting Interval, MRI), and the MRI is used to indicate a minimum time interval between two or more location reporting notifications. When sending the location reporting notification, an MME/SGSN starts a timer with a value set to the MRI. Before the timer expires (namely, when the timer is running), at least one location reporting notification is withheld, and the location reporting notification sent by the MME/SGSN carries a latest withheld location reporting notification. At the same time, the timer is restarted to perform timing. The latest withheld location reporting notification includes the location information of the UE that may be considered as current location information of the UE. A setting of the MRI ensures that the SCS/AS can receive the location information of the UE within a certain period of time, to determine a location update of the UE. This also prevents a network from being affected by signaling load caused by frequent triggering of a location reporting notification when the location update of the UE frequently occurs.

If the monitoring type is set to location reporting, the monitoring request message may further carry an accuracy (Accuracy) of the location information of the UE carried in the location reporting notification, for example, a cell level (Cell level), an (e)NodeB level ((e)NodeB Level), and a TA/RA level (TA/RA level).

If an event monitoring configuration request is for a group of UEs, in other words, when event monitoring is performed on a group of UEs, the monitoring request message carries the external group ID. If the event monitoring configuration request is for single UE, the monitoring request message carries the MSISDN or the external ID.

Step 302: The SCEF saves a parameter carried in the received monitoring request message. The SCEF authorizes the configuration request according to a saved local policy, and after authorization succeeds, the SCEF allocates an SCEF reference ID.

Step 303: The SCEF sends the monitoring request message to an HSS.

The monitoring request message carries the external ID or the external group ID, an SCEF identifier, the SCEF reference ID, and the monitoring type. When the monitoring type is location reporting, the monitoring request message further carries the MRI.

If the SCS/AS provides the accuracy, the SCEF maps the accuracy to a corresponding internal accuracy (Internal Accuracy) according to a saved carrier policy. If no corresponding internal accuracy is available, the SCEF configures the internal accuracy according to the carrier policy.

Step 304: The HSS checks the received monitoring request message, and after a check succeeds, the HSS saves the parameter carried in the received monitoring request message. The HSS determines whether the received monitoring request message carries the external group ID or the external ID, and determines group member UE corresponding to the external group ID or determines the UE corresponding to the external ID.

Step 305: The HSS returns a monitoring response to the SCEF.

If the HSS determines that the received monitoring request message carries the external group ID, a returned monitoring response carries at least the SCEF reference ID and an acceptance indication.

Step 306: The SCEF returns the monitoring response to the SCS/AS, where the monitoring response carries at least a T8 long-term transaction reference identifier TLTRI (T8 Long Term Transaction Reference ID) and the acceptance indication.

If the monitoring request message received by the HSS carries the external ID or the MSISDN, the HSS performs Step 307 to Step 309 for the carried external ID or MSISDN. If the monitoring request message received by the HSS carries the external group ID, the HSS performs Step 307 to Step 309 for each group member UE corresponding to the carried external group ID.

Step 307: The HSS sends an insert subscriber data request message to the MME/SGSN for group member UE or UE, where the insert user subscriber data request message carries the monitoring type, the SCEF identifier, the SCEF reference ID, the internal accuracy, and an external identifier or an MSISDN of the UE. When the monitoring type is location reporting, the insert subscriber data request message further carries the MRI.

Step 308: The MME/SGSN saves a parameter carried in the received insert subscriber data request message, and performs corresponding processing.

Step 309: The MME/SGSN sends an insert subscriber data response message to the HSS, where the insert subscriber data response message carries the acceptance indication.

If the MME/SGSN saves a requested monitoring event, the MME/SGSN further adds a monitoring event report to the insert subscriber data response message. When the monitoring type is location reporting, the monitoring event report includes at least the location reporting notification.

Step 310: The HSS returns a monitoring response message or a monitoring indication message to the SCEF.

If the insert subscriber data response message received by the HSS carries the monitoring event report, and if an event monitoring request is for a group of UEs, the monitoring response message or the monitoring indication message returned by the HSS to the SCEF carries at least the SCEF reference ID, the monitoring event report, and the external identifier or the MSISDN of the UE corresponding to the monitoring event report. If the event monitoring request is for single UE, the monitoring response message or the monitoring indication message returned by the HSS to the SCEF carries at least the SCEF reference ID, the acceptance indication, and the monitoring event report.

The HSS may aggregate a plurality of monitoring event reports from the MME/SGSN, and send the plurality of monitoring event reports to the SCEF in one message.

Step 311: The SCEF sends the monitoring response message or the monitoring indication message to the SCS/AS.

If the monitoring response message or the monitoring indication message received by the SCEF carries the monitoring event report, and if the event monitoring request is for a group of UEs, the monitoring response message or the monitoring indication message sent by the SCEF to the SCS/AS carries at least the TLTRI, the monitoring event report, and the external group identifier or the MSISDN of the UE corresponding to the monitoring event report. If the event monitoring request is for single UE, the monitoring response message or the monitoring indication message sent by the SCEF to the SCS/AS carries at least the TLTRI, the acceptance indication, and the monitoring event report.

If the monitoring response message or the monitoring indication message returned by the HSS carries the plurality of monitoring event reports, the monitoring response message or the monitoring indication message sent by the SCEF to the SCS/AS carries a list of a correspondence of the TLTRI (the monitoring event report, and the external group identifier or the MSISDN of the UE corresponding to the monitoring event report).

Step 312: The SCS/AS returns a monitoring indication response message to the SCEF.

If the event monitoring request is for a group of UEs, the SCS/AS returns the monitoring indication response message for each group member UE.

For a specific event monitoring reporting process based on the configuration process in FIG. 3, refer to FIG. 4. The event monitoring reporting process includes the following steps.

Step 401: An MME/SGSN performs event detection based on a monitoring event parameter delivered in FIG. 3, and starts a timer based on an MRI.

The MME/SGSN detects a UE location change based on an internal accuracy.

Before the timer expires, the MME/SGSN withholds detecting of an event reporting notification corresponding to an event, such as a location change.

Step 402: When the timer expires, and the MME/SGSN saves at least one withheld event reporting notification, the MME/SGSN sends a monitoring indication message to an SCEF, where the monitoring indication message carries at least an SCEF reference ID and a monitoring event report. The monitoring event report carried in the monitoring indication message is a latest event reporting notification in a withheld event reporting notification list, in other words, is an event reporting notification with latest location information of UE.

If a monitoring request is for a group of UEs, monitoring indication information further carries an external identifier or an MSISDN.

Step 403: The SCEF sends the monitoring indication message to an SCS/AS, where the monitoring indication message carries at least a TLTRI and the monitoring event report.

If the SCEF sends a plurality of aggregated event reporting notifications from the MME/SGSN in one message to the SCS/AS, the monitoring indication message carries at least a list of the correspondence of the TLTRI (the monitoring event report, and the external group identifier or the MSISDN of the UE corresponding to the monitoring event report).

If the monitoring request is for a group of UEs, the monitoring indication information further carries the external identifier or the MSISDN.

Step 404: The SCS/AS returns a monitoring indication response message to the SCEF.

FIG. 5 shows an event monitoring configuration process on a 5G network, namely, an event subscription configuration process. The configuration process includes the following steps.

Step 501: An SCS/AS sends an Nnef_EventExposure_Subscribe request message, namely, a subscription request message, to a NEF.

The subscription request message may be understood as the monitoring request message shown in FIG. 3.

The subscription request message carries at least an SCS/AS event notification endpoint, a monitoring event identifier (Event ID(s)), an External Group ID or a generic public subscription identifier GPSI (Generic Public Subscription Identifier), or an indication of all UEs. If event monitoring indicated by a subscription request includes location reporting, the subscription request message further carries an MRI.

If the subscription request is for a group of UEs, the subscription request message carries the External Group Id. If the subscription request is for single UE, the subscription request message carries the GPSI. If the subscription request is for all the UEs, the subscription request message carries the indication of all the UEs.

The event ID(s) include(s) a Cell_Change, a TAI_Change, and a CN_Node_Change.

Step 502: The NEF saves a parameter carried in the received subscription request message. The NEF authorizes a configuration request according to a saved local policy.

Step 503: The NEF sends an Nudm_EventExposure_Subscribe request message to a UDM, where the subscription request message carries the external group ID or the GPSI, the event ID(s), a NEF event notification endpoint, and the MRI.

Step 504: The UDM checks the event monitoring subscription request message. After a check succeeds, the UDM saves the parameter carried in the received subscription request. The UDM determines an internal group ID corresponding to the external group ID, and a subscription permanent identifier SUPI (Subscription Permanent Identifier) corresponding to the GPSI.

If the UDM determines that the subscription request is for a group of UEs, the UDM performs Step 505 on each AMF with which a group member is registered. If the UDM determines that the subscription request is for all the UEs, the UDM performs Step 505 on all the AMFs. If the UDM determines that the subscription request is for single UE, the UDM performs Step 505 on the AMF with which the UE is registered.

Step 505: The UDM sends an Namf_EventExposure_Subscribe request message to the AMF, where the subscription request message carries the NEF event notification endpoint, the event ID(s), the internal group ID, the SUPI, or the indication of all the UEs.

Step 506: The UDM creates an event subscription context based on the subscription request.

Step 507: The AMF returns an Namf_EventExposure_Subscribe response message to the UDM, where the subscription response message carries at least an AMF subscription correlation identifier and an acceptance indication.

Step 508: The UDM creates the event subscription context, and the UDM sends the Ndum_EventExposure_Subscribe response message to the NEF, where the subscription response message carries a UDM subscription correlation identifier and the acceptance indication.

Step 509: The NEF creates the event subscription context, and the NEF sends the Nnef_EventExposure_Subscribe response message to the SCS/AS, where the subscription response message carries a NEF subscription correlation identifier and the acceptance indication.

For details of an event subscription process based on the configuration process in FIG. 5, refer to FIG. 6. The event subscription process includes the following steps.

Step 601: An AMF performs event detection based on a subscription event parameter delivered in FIG. 5, and starts a timer based on an MRI.

The AMF detects a location change based on event ID(s) and detects a corresponding event, namely, a location change.

Before the timer expires, the AMF withholds detecting of an event reporting notification corresponding to an event, such as the location change.

Step 602: When the timer expires, and the AMF saves at least one withheld event reporting notification, the AMF sends an Namf_EventExposure_Notify request message to a NEF, where the notification request message carries an SCEF reference ID and a monitoring event report. The monitoring event report is a latest event reporting notification in a withheld event reporting notification list, in other words, is an event reporting notification with latest location information of UE, such as a cell ID and a TAI.

If the monitoring request is for a group of UEs, the message further carries a GPSI.

Step 603: The NEF returns a confirmation message Nnef_EventExposure_Notify response, namely, a notification response message.

Step 604: The NEF sends an Nnef_EventExposure_Notify request message to an SCS/AS, where the notification request message carries an SCS/AS event notification endpoint and the monitoring event report.

If a message received by the NEF includes the GPSI, a message sent by the NEF to the SCS/AS further carries the GPSI.

Step 605: The SCS/AS returns the confirmation message Nnef_EventExposure_Notify response, namely, the notification response message, to the NEF.

Based on the foregoing description of the event monitoring process in the prior art, when the UE moves between MMEs/SGSNs/AMFs, a new MME/SGSN/AMF to which the UE moves resets a timer based on the MRI. Therefore, an interval between two location reporting notifications of the UE may exceed the MRI. In extreme cases, a UE location changes for a plurality of times, and an interval between two adjacent location changes does not exceed the MRI. In this case, the MME/SGSN/AMF does not send a location reporting notification. As a result, the SCS/AS cannot monitor a location update of the UE in time. In view of this, to ensure that the SCS/AS can monitor a location update status of the UE in time, this application provides an event monitoring method to avoid an excessively long time interval between two location reporting notifications of the UE.

Specifically, in a mobility management network element reselection process, if the UE moves from the first mobility management network element to the second mobility management network element, the first mobility management network element sends a current value of a first timer corresponding to the UE maintained by the first mobility management network element as a first duration value to the second mobility management network element. The second mobility management network element receives the first duration value, and sets an initial value of a second timer corresponding to the UE maintained by the second mobility management network element. This ensures that when using the second timer to perform timing, the second mobility management network element continues to perform timing on a basis that the first mobility management network element has performed timing, instead of resetting a timer for re-timing. When determining that the second timer expires, the second mobility management network element sends a withheld location reporting notification of the UE, and an interval between two location reporting notifications of the UE is not excessively long. This ensures that an SCS/AS can monitor a location update of the UE in time. A specific process of monitoring an event is described in detail in the following embodiment. First, refer to an event monitoring process shown in FIG. 7. The process includes the following steps.

Step 701: In a mobility management network element reselection process, a first mobility management network element determines a first duration value.

The first duration value is a current value of a first timer corresponding to UE maintained by the first mobility management network element, and before the first timer expires, the first mobility management network element withholds sending of a location reporting notification of the UE. In the mobility management network element reselection process, if the UE moves from the first mobility management network element to a second mobility management network element, to implement event monitoring, before mobility management network element reselection occurs on the UE, the first mobility management network element needs to obtain event monitoring configuration based on the configuration process shown in FIG. 3 or FIG. 5.

For example, when the UE moves from an area managed by the first mobility management network element to an area managed by the second mobility management network element, the second mobility management network element sends a context request message to the first mobility management network element. If the first mobility management network element receives the context request message sent by the second mobility management network element, the first mobility management network element determines that the mobility management network element reselection occurs on the UE.

If the first mobility management network element determines that the mobility management network element reselection occurs on the UE, the first mobility management network element determines the current value of the first timer corresponding to the UE maintained by the first mobility management network element as the first duration value, where the first duration value can indicate timed duration of the first timer (corresponding to the following countup) or remaining duration of a minimum time interval (corresponding to the following countdown) of the first timer corresponding to the UE maintained by the first mobility management network element.

Therefore, optionally, before determining the first duration value, the first mobility management network element may set the first timer corresponding to the UE maintained by the first mobility management network element. The process may be implemented in the configuration process shown in FIG. 3 or FIG. 5.

When the first mobility management network element sets the first timer corresponding to the UE, a user data management network element sends a minimum reporting interval MRI, where the MRI is a minimum time interval between two or more location reporting notifications. The first mobility management network element receives the MRI, starts the first timer corresponding to the UE, and sets an initial value of the first timer based on the MRI.

In an example, if the timer maintained by the first mobility management network element is counting up, the initial value of the first timer is set to 0, and a timing threshold is set to the MRI.

In another example, if the timer maintained by the first mobility management network element is counting down, the initial value of the first timer is set to the MRI.

Specifically, the current value of the first timer corresponding to the UE maintained by the mobility management network element may be indicated by a current maximum reporting interval (Current Maximum Reporting Interval, CMRI). For example, the current value of the first timer corresponding to the UE maintained by the first mobility management network element, namely, the first duration value, may be indicated by a CMRI 1.

Before the first timer corresponding to the UE maintained by the first mobility management network element expires, the first mobility management network element withholds sending of the location reporting notification of the UE, and sends the withheld location reporting notification of the UE when the first timer expires.

Specifically, when the first timer expires, if there is at least one withheld location reporting notification of the UE, the first mobility management network element may randomly select a location reporting notification of the UE from the withheld location reporting notification of the UE to report, and may alternatively send a latest location reporting notification in the withheld location reporting notification of the UE.

Optionally, when sending the withheld location reporting notification of the UE, the first mobility management network element restarts the first timer and sets an initial value of a restarted first timer based on the MRI.

Step 702: The first mobility management network element sends the first duration value to the second mobility management network element.

In an example, the first mobility management network element may directly send a determined first duration value to the second mobility management network element.

In another example, if the first mobility management network element receives the context request message sent by the second mobility management network element, the first mobility management network element may add a determined first duration value to a context response message, and send the context response message to the second mobility management network element.

Step 703: The second mobility management network element receives the first duration value sent by the first mobility management network element.

In an example, the second mobility management network element receives the first duration value directly sent by the first mobility management network element.

In another example, the second mobility management network element receives the context response message that is sent by the first mobility management network element and that carries the first duration value.

Step 704: The second mobility management network element starts a second timer corresponding to the UE maintained by the second mobility management network element, and sets an initial value of the second timer based on the first duration value.

To implement event monitoring reporting so that an SCS/AS can detect location information of the UE, the second mobility management network element needs to start the second timer corresponding to the UE maintained by the second mobility management network element to perform timing.

When starting the second timer corresponding to the UE, the second mobility management network element sets the initial value of the second timer based on the received first duration value.

In an example, if the timer maintained by the second mobility management network element is counting up, the received first duration value is set to a timed initial value of the second timer.

In another example, if the timer maintained by the second mobility management network element is counting down, the received first duration value is set to an initial value obtained when the second timer is counting down.

Step 705: When the second timer expires, the second mobility management network element sends the withheld location reporting notification of the UE.

Optionally, before the second timer expires, the second mobility management network element withholds sending of the location reporting notification of the UE.

Optionally, when the second timer expires, if there is at least one withheld location reporting notification of the UE, the second mobility management network element may randomly select a location reporting notification of the UE from the withheld location reporting notification of the UE to report, and may alternatively send a latest location reporting notification in the withheld location reporting notification of the UE.

The latest location reporting notification in the withheld location reporting notification of the UE is a newest location reporting notification in the withheld location reporting notification of the UE. Location information of the UE in the latest location reporting notification may be considered as current location information of the UE.

Optionally, when the second timer expires, the second mobility management network element resets the second timer corresponding to the UE maintained by the second mobility management network element.

Specifically, the user data management network element sends the minimum reporting interval MRI, where the MRI is the minimum time interval between two or more location reporting notifications. The second mobility management network element receives the MRI, and before the second timer expires, restarts the second timer corresponding to the UE, and sets the initial value of the second timer based on the MRI.

In an example, if the timer maintained by the second mobility management network element is counting up, the initial value of the second timer is set to 0, and a timing threshold is set to the MRI.

In another example, if the timer maintained by the second mobility management network element is counting down, the initial value of the second timer is set to the MRI.

The first mobility management network element or the second mobility management network element is any one of an MME, an SGSN, or an AMF. It should be noted that the first mobility management network element and the second mobility management network element may be mobility management network elements in a same type of network. For example, both the first mobility management network element and the second mobility management network element are mobility management network elements on a 4G network, or both are mobility management network elements on a 5G network. Alternatively, the first mobility management network element and the second mobility management network element may be mobility management network elements in different types of networks. For example, the first mobility management network element is a mobility management network element on a 4G network, and the second mobility management network element is a mobility management network element on a 5G network.

Figure 8:
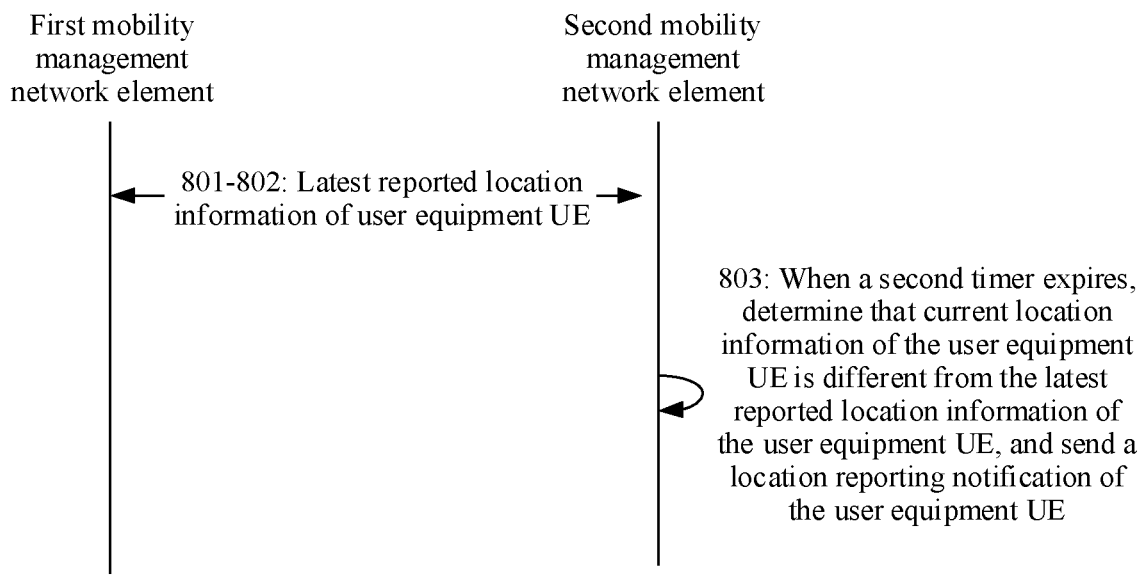
FIG. 8 is a schematic diagram of an event monitoring method applicable to an embodiment of this application.

In addition, before the timer expires, if the UE moves between MMEs/SGSNs/AMFs, and returns to an original MME/SGSN/AMF, to be specific, in the mobility management network element reselection process, the UE moves from the first mobility management network element to the second mobility management network element, and before the timer expires, the UE moves back from the second mobility management network element to the original first mobility management network element. Because location information of the UE reported by the initial first mobility management network element for the last time is cleared, when the timer expires, the first mobility management network element re-reports the location reporting notification of the UE. If the location information of the UE is consistent in location reporting notifications of the UE that are continuously reported, it is meaningless for the SCS/AS to detect a location update of the UE. As a result, signaling load is increased and network resources are wasted. In view of this, on the basis of ensuring that the SCS/AS can monitor the location update of the UE in time, in the event monitoring method provided in this application, when the location information of the UE reported for the last time is consistent with detected current location information of the UE, the location reporting notification of the UE is not reported. This saves network resources. For details, refer to an event monitoring process shown in FIG. 8. The process includes the following steps.

Step 801: A first mobility management network element sends latest reported location information of UE to a second mobility management network element.

Figure 7:
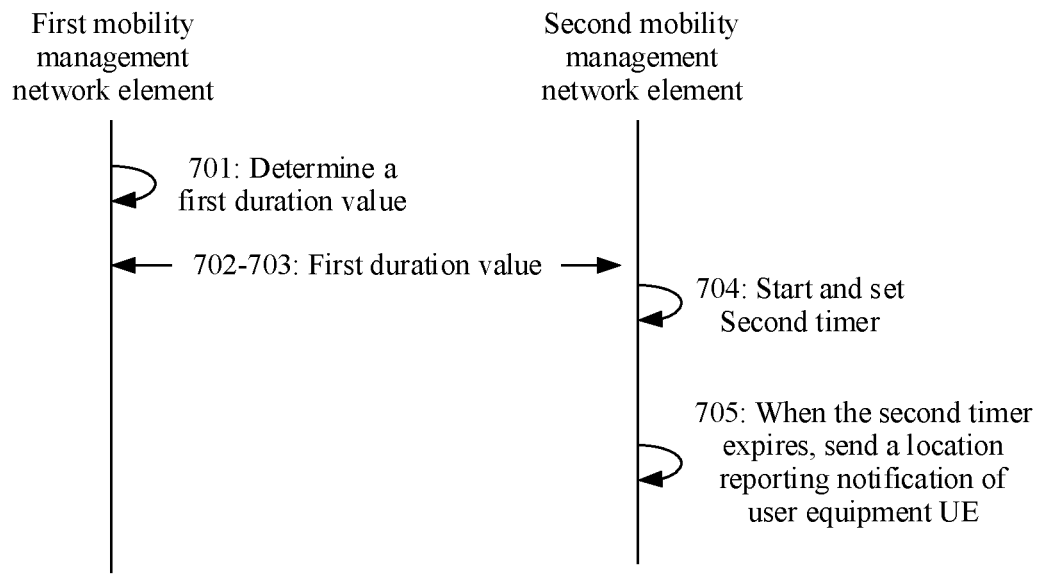
FIG. 7 is a schematic diagram of an event monitoring method applicable to an embodiment of this application.

According to the description in FIG. 7, it can be learned that when a first timer corresponding to the UE maintained by the first mobility management network element expires, the first mobility management network element may send a withheld location reporting notification of the UE, and specifically may send a latest location reporting notification in the withheld location reporting notification of the UE.

If the first mobility management network element sends the latest location reporting notification in the withheld location reporting notification of the UE, after sending the latest location reporting notification, the first mobility management network element saves location information of the UE in the latest location reporting notification as the latest reported location information of the UE.

The first mobility management network element saves the latest reported location information of the UE, so that the first mobility management network element sends the latest reported location information of the UE to the second mobility management network element, and if the UE moves back to the first mobility management network element before the timer expires, the first mobility management network element determines whether to report the location reporting notification of the UE.

Therefore, the latest reported location information of the UE saved by the first mobility management network element may be latest reported location information of the UE sent to the first mobility management network element when the UE moves from another mobility management network element to the first mobility management network element, where the another mobility management network element may include the second mobility management network element. Alternatively, the latest reported location information of the UE saved by the first mobility management network element may be location information of the UE in the location reporting notification sent by the first mobility management network element when the first timer expires before the first timer is set.

When the first timer corresponding to the UE maintained by the first mobility management network element expires, the first mobility management network element determines that current location information of the UE is different from the saved latest reported location information of the UE, and sends the withheld location reporting notification of the UE.

Optionally, to save network resources, when the first timer corresponding to the UE maintained by the first mobility management network element expires, and it is determined that the current location of the UE is the same as the saved latest reported location information of the UE, the first mobility management network element skips sending the location reporting notification of the UE.

Optionally, before the first timer expires, when determining that the current location information of the UE is different from the saved latest reported location information of the UE, the first mobility management network element generates the withheld location reporting notification of the UE. When determining that the current location information of the UE is the same as the saved latest reported location information of the UE, the first mobility management network element does not generate the withheld location reporting notification of the UE.

The first mobility management network element sends the location information of the UE in the sent latest location reporting notification as the latest reported location information of the UE.

In an example, the first mobility management network element may directly send the latest reported location information of the UE to the second mobility management network element.

In another example, if the first mobility management network element receives a context request message sent by the second mobility management network element, the first mobility management network element may add the latest reported location information of the UE to a context response message, and send the context response message to the second mobility management network element.

Step 802: The second mobility management network element receives the latest reported location information of UE sent by the first mobility management network element.

In an example, the second mobility management network element receives the latest reported location information directly sent by the first mobility management network element.

In another example, the second mobility management network element receives the context response message that is sent by the first mobility management network element and that carries the latest reported location information of the UE.

Step 803: When a second timer expires, the second mobility management network element determines that the current location information of the UE is different from the latest reported location information of the UE, and sends the withheld location reporting notification of the UE.

Because the mobility management network element can determine the location information of the UE within a range managed by the mobility management network element, when the second timer expires, to ensure that an SCS/AS can detect a location update of the UE in time, the second mobility management network element determines that the current location information of the UE is different from the latest reported location information of the UE, and sends the withheld location reporting notification to the UE.

If the second mobility management network element sends the latest location reporting notification in the withheld location reporting notification of the UE, after sending the latest location reporting notification, the second mobility management network element saves the location information of the UE in the latest location reporting notification as the latest reported location information of the UE.

In addition, to save network resources, when the second timer expires and the current location information of the UE is the same as the latest reported location information of the UE, the second mobility management network element skips sending the location reporting notification of the UE.

If the second mobility management network element skips sending the location reporting notification of the UE, the second mobility management network element may continue to save the location information sent by the first mobility management network element as the latest reported location information of the UE.

Optionally, before the second timer expires, when determining that the current location information of the UE is different from the saved latest reported location information of the UE, the second mobility management network element generates the withheld location reporting notification of the UE. When determining that the current location information of the UE is the same as the saved latest reported location information of the UE, the second mobility management network element does not generate the withheld location reporting notification of the UE.

If the second timer is a timer set based on a first duration value sent by the first mobility management network element, the latest reported location information of the UE saved by the second mobility management network element is the location information of the UE sent by the first mobility management network element. If the second timer is a timer reset by the second mobility management network element after the second mobility management network element sends the location reporting notification of the UE, the latest reported location information of the UE saved by the second mobility management network element is the location information of the UE in the location reporting notification of the UE sent by the second mobility management network element.

The following describes an event monitoring process in this application by using two specific embodiments.

Embodiment 1

Figure 9:
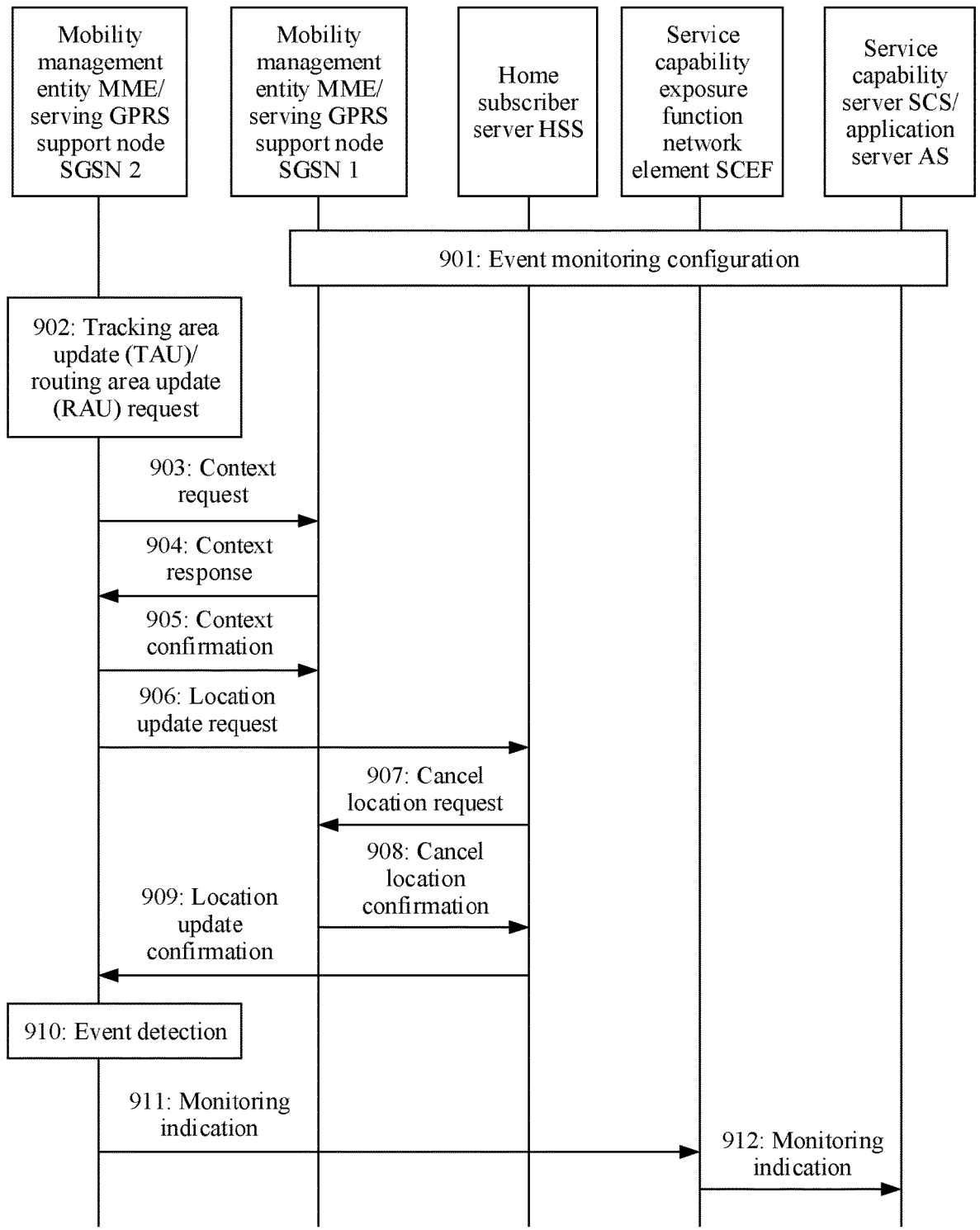
FIG. 9 is a schematic flowchart of event monitoring reporting on a 4G network applicable to an embodiment of the present invention.

When this application is applied to a 4G network, assuming that UE moves from an MME/SGSN 1 to an MME/SGSN 2, refer to an event monitoring reporting process shown in FIG. 9. The event monitoring reporting process includes the following steps.

Step 901: The MME/SGSN 1 performs event monitoring configuration based on the configuration process shown in FIG. 3.

Step 902: The UE moves to an area managed by the MME/SGSN 2, and the MME/SGSN 2 receives a tracking area update (Tracking Area Update, TAU)/routing area update (Routing Area Update, RAU) request from the UE.

Step 903: The MME/SGSN 2 sends a context request message to the MME/SGSN 1.

Step 904: The MME/SGSN 1 returns a context response message to the MME/SGSN 2.

The context response message carries an SCEF identifier, an SCEF reference ID, and a current value CMRI 1 of a first timer corresponding to the UE. If the MME/SGSN 1 has sent a location reporting notification to an SCEF, the context response message further includes location information in a last location reporting notification last location info.

The location information in the last location reporting notification last location info includes a cell ID, an (e)NodeB ID, a TAI, or the like.

Step 905: The MME/SGSN 2 returns a confirmation message to the MME/SGSN 1.

Step 906: The MME/SGSN 2 sends a location update request to an HSS.

Step 907: The HSS sends a cancel location request to the MME/SGSN 1.

Step 908: The MME/SGSN 1 returns a response message to the HSS, namely, a cancel location confirmation message.

Step 909: The HSS returns a location update confirmation message to the MME/SGSN 2.

The location update confirmation message carries event monitoring configuration information, including at least a monitoring type, the SCEF identifier, the SCEF reference ID, an MRI, an internal accuracy, and an external identifier or an MSISDN.

Step 910: The MME/SGSN 2 performs event detection.

Specifically, the MME/SGSN 2 performs event monitoring based on a monitoring event parameter carried in the location update confirmation message delivered in Step 909, starts a second timer corresponding to the UE, and sets an initial value of the second timer based on the CMRI 1.

The MME/SGSN 2 performs the event monitoring based on the internal accuracy, and detects a location change.

Before the second timer expires, the MME/SGSN 2 withholds an event reporting notification corresponding to a detected event (namely, a location change).

Step 911: When the second timer expires, and the MME/SGSN 2 saves at least one withheld event reporting notification, the MME/SGSN 2 sends a monitoring indication to the SCEF.

The monitoring indication carries the SCEF reference ID and the location reporting notification.

If a monitoring request is for a group of UEs, the monitoring request further includes the external identifier or the MSISDN. A monitoring event report is a latest event reporting notification in a withheld event reporting notification list, in other words, the latest event reporting notification includes latest location information of the UE, namely, current location information of the UE.

If the MME/SGSN 2 receives the last location info from the MME/SGSN 1, the MME/SGSN 2 determines whether the location change occurs based on the last location info and the current location information of the UE. If the last location info is different from the current location information of the UE, the MME/SGSN 2 determines that the location change occurs. Otherwise, the MME/SGSN 2 determines that no location change occurs.

Because the MME/SGSN 2 sets the second timer based on the CMRI 1, for the MME/SGSN 2, the last location info is definitely different from the current location information of the UE. In other words, in this case, the cell ID, the (e)NodeB ID, or the TAI/RAI definitely changes. Therefore, in this scenario, when the second timer expires, the MME/SGSN 2 definitely sends the location reporting notification.

Step 912: The SCEF sends the monitoring indication to an SCS/AS.

The monitoring indication carries at least a TLTRI and the location reporting notification.

If the monitoring request is for a group of UEs, the monitoring indication further includes the external identifier or the MSISDN.

Figure 10A:
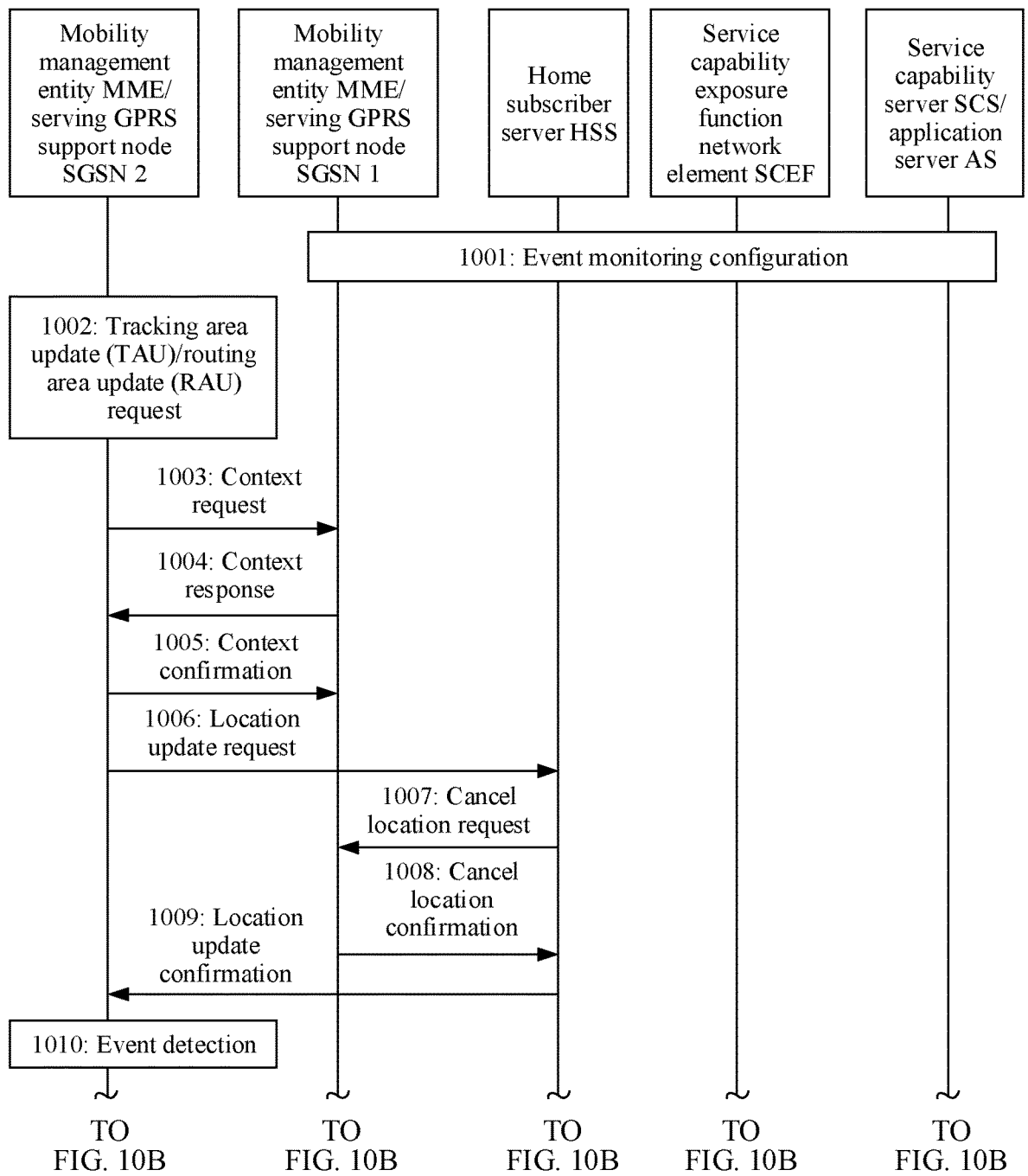
FIG. 10A and FIG. 10B are a schematic flowchart of event monitoring reporting on a 4G network applicable to an embodiment of the present invention.
Figure 10B:
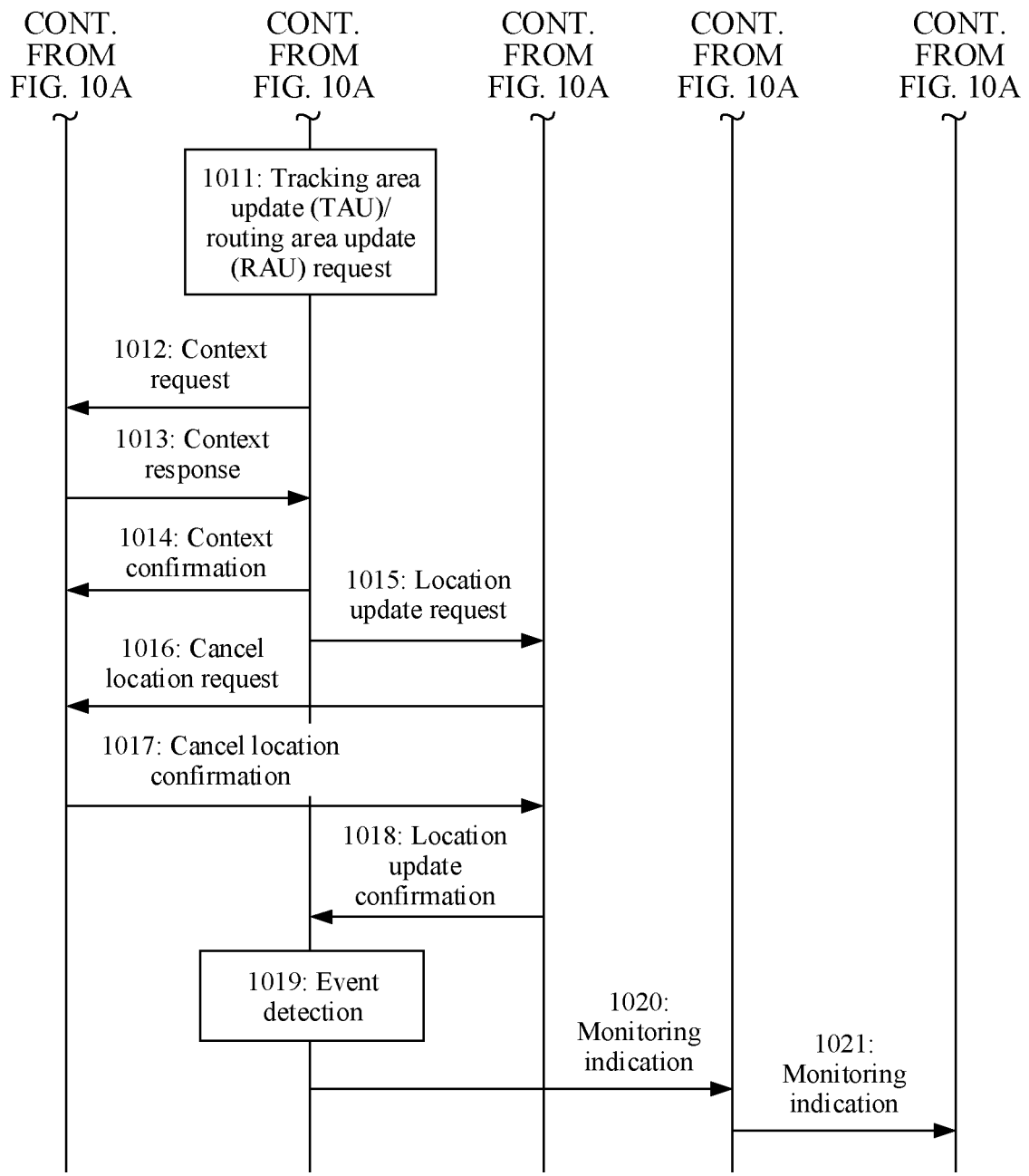

To facilitate understanding, in this application, when location information of the UE reported for the last time is consistent with detected current location information of the UE, the mobility management network element does not report a location reporting notification of the UE. Assuming that when the UE moves from an MME/SGSN 1 to an MME/SGSN 2, and moves back from the MME/SGSN 2 to the MME/SGSN 1, for details, refer to an event monitoring reporting process shown in FIG. 10A and FIG. 10B. The process specifically includes the following steps.

An implementation process of Step 1001 to Step 1010 is the same as that of Step 901 to Step 910 shown in FIG. 9, and details are not described herein again.

Step 1011: The UE moves to an area managed by the MME/SGSN 1, and the MME/SGSN 1 receives the TAU/RAU request from the UE.

Step 1012: The MME/SGSN 1 sends a context request message to the MME/SGSN 2.

Step 1013: The MME/SGSN 2 returns the context response message to the MME/SGSN1.

The context response message carries the SCEF identifier, the SCEF reference ID, and a current value CMRI 2 of the second timer corresponding to the UE.

If the MME/SGSN 2 has sent the location reporting notification to the SCEF, last location info included in the context response message is location information in a monitoring event report reported by the MME/SGSN 2 for the last time. Otherwise, if the MME/SGSN 2 receives the last Location Info from the MME/SGSN 1, the last location info included in the context response message is the last location info sent by the MME/SGSN 1.

Step 1014: The MME/SGSN 1 returns the confirmation message to the MME/SGSN 2.

Step 1015: The MME/SGSN1 sends the location update request to the HSS.

Step 1016: The HSS sends the cancel location request to the MME/SGSN2.

Step 1017: The MME/SGSN 2 returns the response message to the HSS, namely, the cancel location confirmation message.

Step 1018: The HSS returns the location update confirmation message to the MME/SGSN 1.

The location update confirmation message carries the event monitoring configuration information, including at least the monitoring type, the SCEF identifier, the SCEF reference ID, the MRI, the internal accuracy, and the external identifier or the MSISDN.

Step 1019: The MME/SGSN 1 performs the event detection.

The event monitoring is performed based on the monitoring event parameter carried in the location update confirmation message delivered in Step 1018, the first timer corresponding to the UE is started, and an initial value of the first timer is set based on the CMRI 2.

The MME/SGSN 1 performs the event monitoring based on the internal accuracy and detects the location change.

Before the first timer expires, the MME/SGSN 1 withholds the event reporting notification corresponding to the detected event (namely, the location change).

Step 1020: When the first timer expires, and the MME/SGSN 1 saves at least one withheld event reporting notification, the MME/SGSN 1 sends a monitoring indication to the SCEF.

The monitoring indication carries the SCEF reference ID, namely, the location reporting notification.

If a monitoring request is for a group of UEs, the monitoring request further includes the external identifier or the MSISDN. The monitoring event report is a latest event reporting notification in a withheld event report notification list, in other words, the latest event reporting notification includes latest location information of the UE, namely, current location information of the UE.

If the MME/SGSN 1 receives the last location info from the MME/SGSN 2, the MME/SGSN 1 determines whether the Location Change occurs based on the last location info and the current location information of the UE.

Because the UE moves from the MME/SGSN 2 back to the MME1/SGSN 1, the Last Location Info may carry the location information previously reported by the MME/SGSN 1 to the SCEF. Therefore, the current location information of the UE may be the same as the last location info. In this case, when the first timer expires, the MME/SGSN 1 skips sending the location reporting notification to the UE.

If the last location info carries the location information reported by the MME/SGSN 2 to the SCEF, the current location information of the UE is different from the last location info. Therefore, in this case, when the first timer expires, the MME/SGSN 1 sends the location reporting notification of the UE.

Step 1021: The SCEF sends the monitoring indication to an SCS/AS.

The monitoring indication carries at least a TLTRI and the location reporting notification.

If the monitoring request is for a group of UEs, the monitoring request further includes the external identifier or the MSISDN.

Embodiment 2

Figure 11:
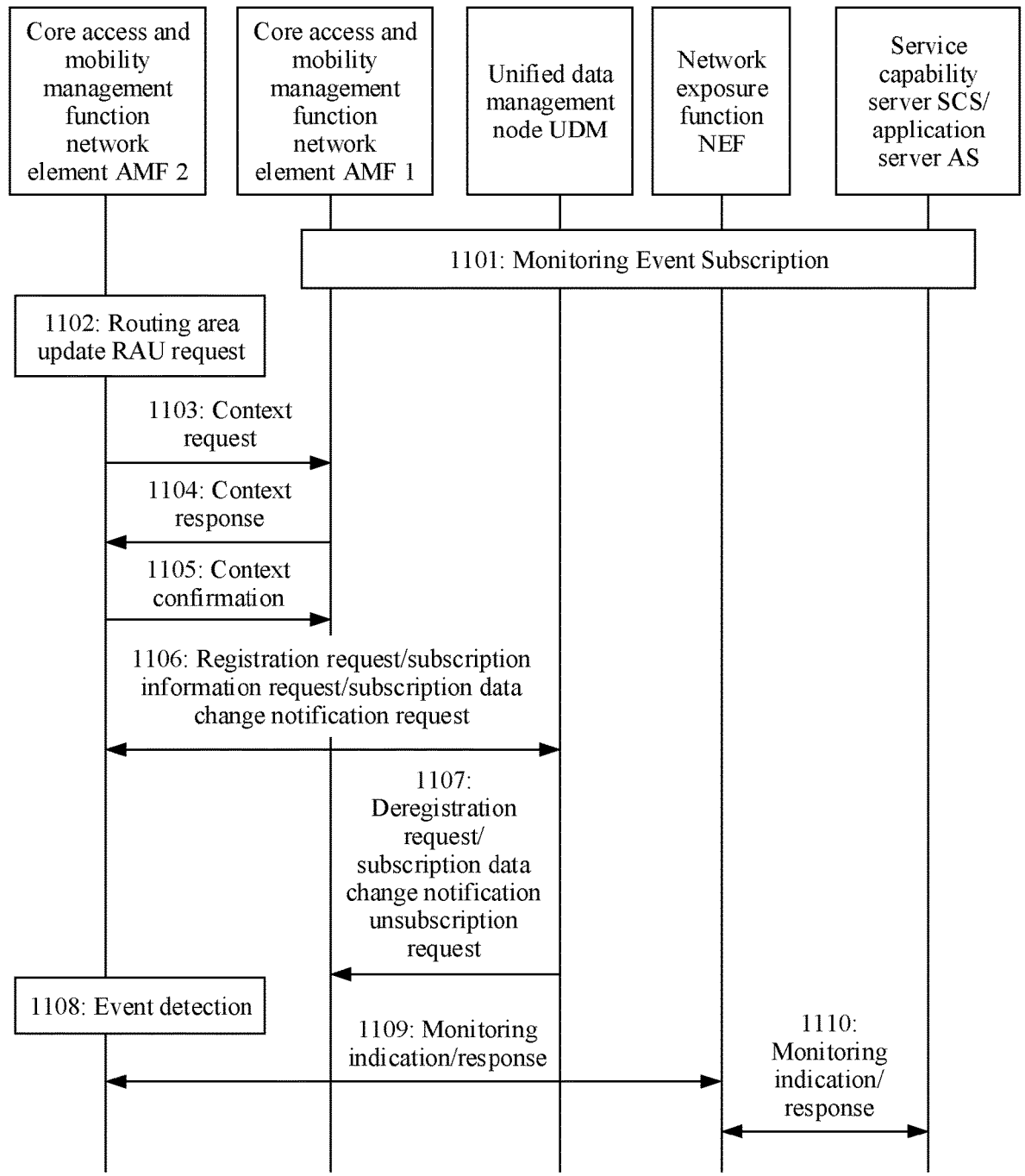
FIG. 11 is a schematic flowchart of event monitoring reporting on a 5G network applicable to an embodiment of the present invention.

When this application is applied to a 5G network, assuming that UE moves from an AMF 1 to an AMF 2, refer to an event monitoring reporting process shown in FIG. 11. The event monitoring reporting process includes the following steps.

Step 1101: The AMF 1 performs monitoring event subscription based on the configuration process shown in FIG. 5.

Step 1102: The UE moves to an area managed by the AMF 2, and the AMF 2 receives a registration area update request from the UE, namely, an RAU update request.

Step 1103: The AMF 2 sends a context request message, for example, an Namf_Communication_UEContextTransfer message, to the AMF 1.

Step 1104: The AMF 1 returns a context response message, for example, an Namf_Communication_UEContext-Transfer response message, to the AMF 2.

The context response message carries an event subscription context, where the event subscription context includes at least an internal group ID, (an) event ID(s), a NEF event notification endpoint, an MRI, and a current value CMRI 1 of a first timer corresponding to the UE. If the AMF 1 has sent a location report to a NEF, the context response message further reports location information last location info in a last monitoring event report.

Step 1105: The AMF 2 returns a context confirmation message, for example, an Namf_Communication_RegistrationCompleteNotify message, to the AMF 1.

Step 1106: The AMF 2 sends a registration request, for example, an Nudm_UECM_Registration message, to the UDM, and the UDM returns a response message. Alternatively, the AMF 2 sends a UE subscription information obtaining request, for example, an Nudm_SDM_GET message, to the UDM, and the UDM returns a response message. Alternatively, the AMF 2 sends a subscription data change notification request, for example, an Nudm_SDM_Subsribed message, to the UDM, and the UDM returns a response message.

Step 1107: The UDM sends a deregistration request, for example, an Nudm_UECM_DeregistrationNotify message, to the AMF 1, and the AMF 1 returns a response message.

The AMF 1 sends a subscription data change notification unsubscription request, for example, an Nudm_SDM_Unsubsribe message, to the UDM, and the UDM returns a response message.

Step 1108: The AMF 2 performs event detection. For example, the AMF 2 performs event monitoring based on an event subscription parameter carried in the context response message obtained in Step 1104, starts a second timer corresponding to the UE, and sets an initial value of the second timer based on the CMRI 1.

An MME/SGSN 2 performs the event monitoring based on an event ID and detects a location change.

Before the second timer expires, the AMF 2 withholds an event reporting notification corresponding to a detected event (namely, a location change).

Step 1109: When the second timer expires, and the AMF 2 saves at least one withheld event reporting notification, the AMF 2 sends a monitoring indication, for example, an Namf_EventExposure_Notify request message, to the NEF, and the NEF returns a response message, for example, an Namf_EventExposure_Notify response message.

The monitoring indication carries the NEF event notification endpoint and a monitoring event report.

If a monitoring request is for a group of UEs, the monitoring request further includes a GPSI. The monitoring event report is a latest event reporting notification in a withheld event reporting notification list, in other words, the latest event reporting notification includes latest location information of the UE, namely, current location information of the UE.

If the AMF 2 receives the Last Location Info from the AMF 1, the AMF 2 determines whether the Location Change occurs based on the Last Location Info and the current location information of the UE.

Because the AMF 2 sets the second timer based on the CMRI 1, for the AMF 2, the last location info is definitely different from the current location information of the UE. In other words, in this case, a cell ID, an NgNodeB ID, or an RAI definitely changes. Therefore, in this scenario, when the second timer expires, the AMF 2 definitely sends the event reporting notification.

Step 1110: The NEF sends the monitoring indication, for example, an Namf_EventExposure_Notify request message, to an SCS/AS, and the SCS/AS returns a response message, for example, an Namf_EventExposure_Notify response message.

The monitoring indication carries at least an SCS/AS event notification endpoint and a location reporting notification.

If the monitoring request is for a group of UEs, the monitoring request further includes the GPSI.

Figure 12A:
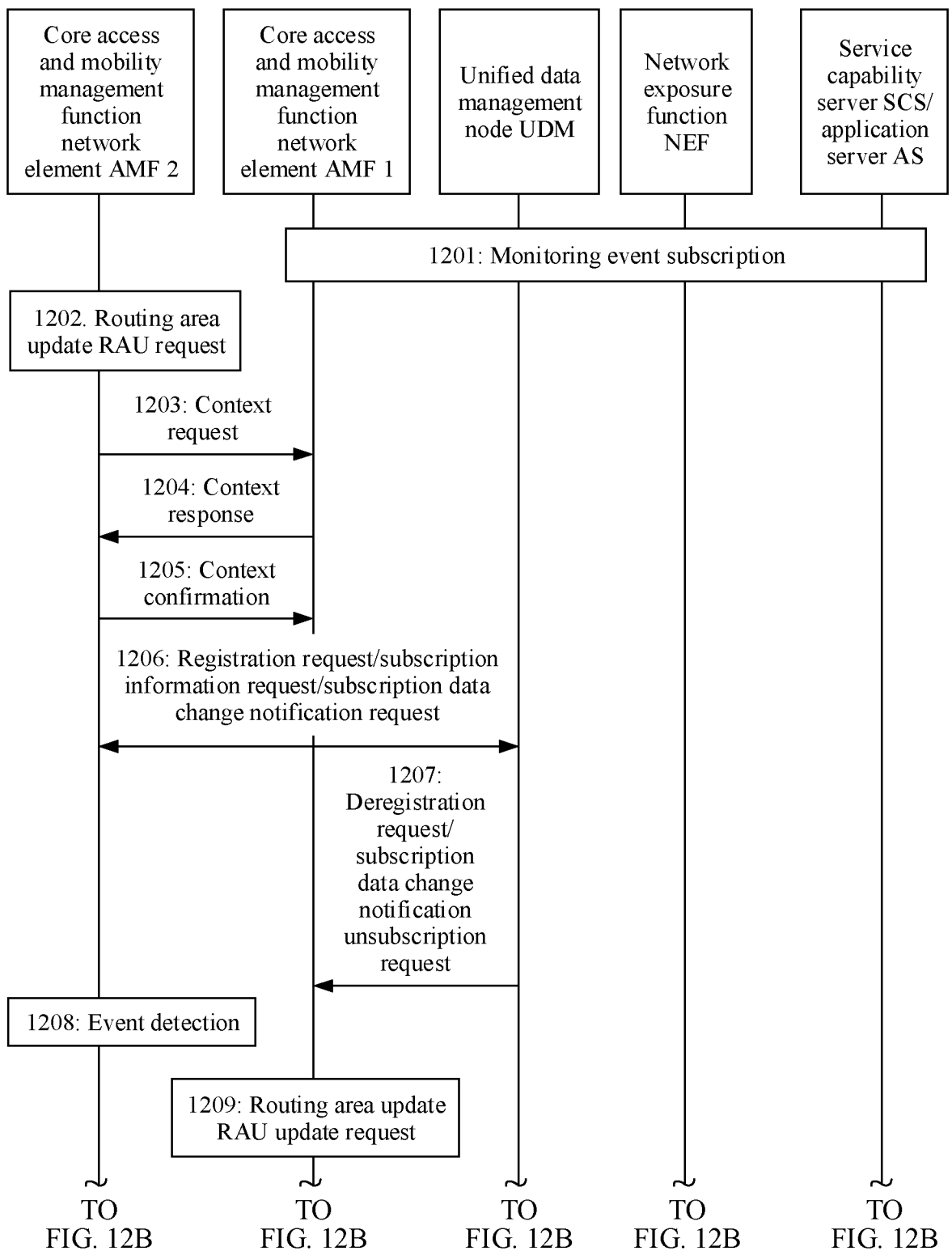
FIG. 12A and FIG. 12B are a schematic flowchart of event monitoring reporting on a 5G network applicable to an embodiment of the present invention.
Figure 12B:
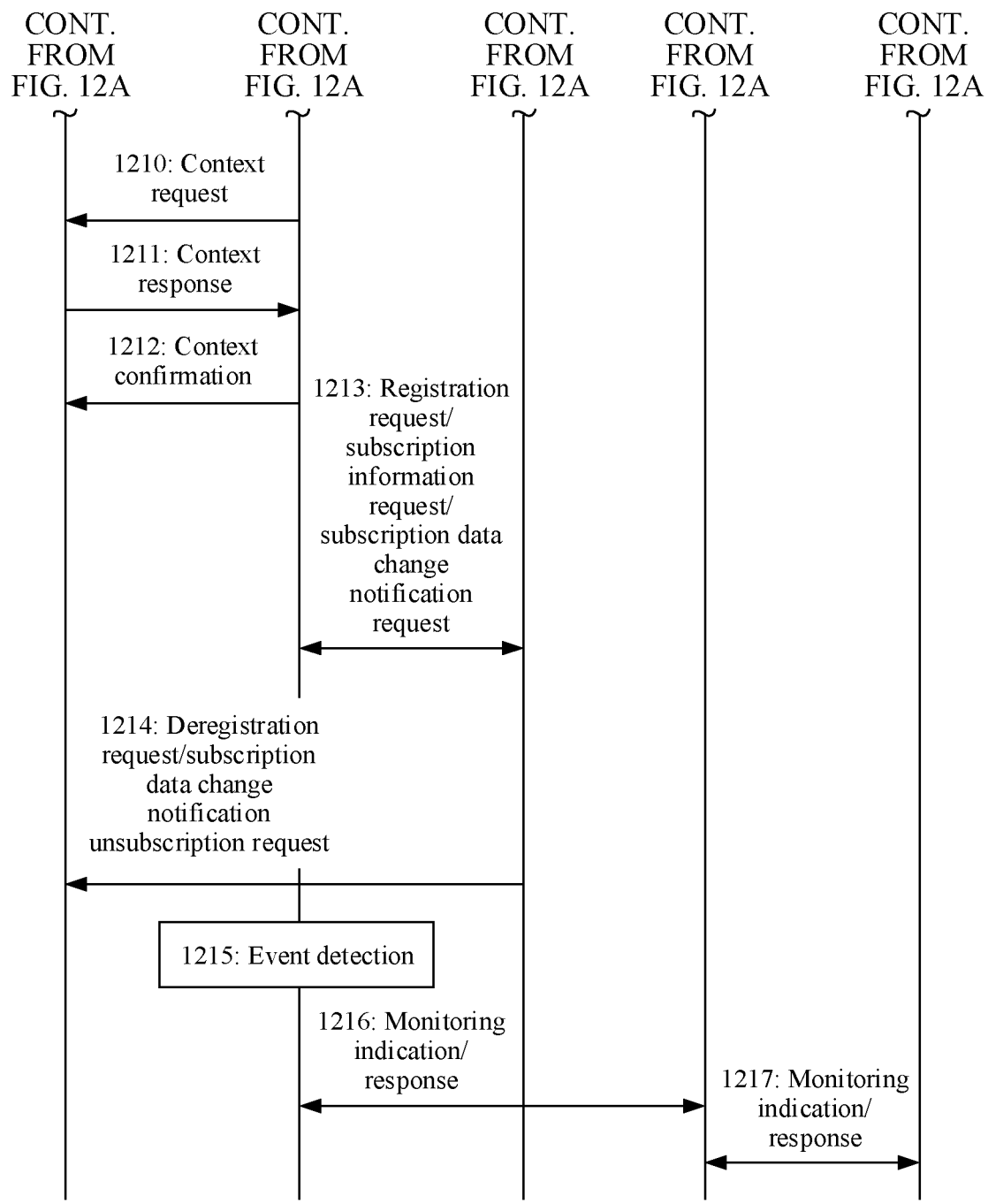

To facilitate understanding, in this application, when location information of UE reported for the last time is consistent with detected current location information of the UE, a mobility management network element does not report a location reporting notification of the UE. Assuming that when the UE moves from an AMF 1 to an AMF 2, and then moves from the AMF 2 to the AMF 1, for details, refer to an event monitoring reporting process shown in FIG. 12A and FIG. 12B. The process specifically includes the following steps.

An implementation process of Step 1201 to Step 1208 is the same as that of Step 1101 to Step 1108 shown in FIG. 11, and details are not described herein again.

Step 1209: The UE moves to an area managed by the AMF 1, and the AMF 1 receives the registration area update request from the UE, namely, the RAU update request.

Step 1210: The AMF 1 sends a context request message, for example, the Namf_Communication_UEContextTransfer message, to the AMF 2.

Step 1211: The AMF 2 returns the context response message, for example, the Namf_Communication_UEContextTransfer response message, to the AMF 1.

The context response message carries the event subscription context, where the event subscription context includes at least the internal group ID, the event ID(s), the NEF event notification endpoint, the MRI, and a current value CMRI 2 of the second timer corresponding to the UE.

If the AMF 2 has sent a monitoring event report to the NEF, last location info included in the context response message is location information in a monitoring event report reported by the AMF 2 for the last time. Otherwise, if the AMF 2 receives the last location info from the AMF 1, the last location info included in the context response message is the last location info sent by the AMF 1.

Step 1212: The AMF 1 returns the context confirmation message, for example, the Namf_Communication_RegistrationCompleteNotify message, to the AMF 2.

Step 1213: The AMF 1 sends the registration request, for example, the Nudm_UECM_Registration message, to the UDM, and the UDM returns the response message. Alternatively, the AMF 1 sends the UE subscription information obtaining request, for example, the Nudm_SDM_GET message, to the UDM, and the UDM returns the response message. Alternatively, the AMF 1 sends the subscription data change notification request, for example, the Nudm_SDM_Subsribed message, to the UDM, and the UDM returns the response message.

Step 1214: The UDM sends the deregistration request message, for example, the Nudm_UECM_DeregistrationNotify message, to the AMF 2, and the AMF 2 returns the response message. Alternatively, the AMF 2 sends the subscription data change notification unsubscription request, for example, Nudm_SDM_Unsubsribe, to the UDM, and the UDM returns the response message.

Step 1215: The AMF 1 performs the event detection based on the event subscription parameter carried in the context response message obtained in Step 1211, starts the first timer corresponding to the UE, and sets an initial value of the first timer based on the CMRI 2.

The AMF detects an event change based on the event ID.

Before the first timer expires, the AMF 1 withholds the event reporting notification corresponding to the detected event (namely, the location change).

Step 1216: When the timer expires, and the AMF 1 saves at least one withheld event reporting notification, the AMF 1 sends a monitoring indication, for example, an Namf_EventExposure_Notify request message, to the NEF, and the NEF returns a response message, for example, an Namf_EventExposure_Notify response message.

The monitoring indication carries the NEF event notification endpoint and the monitoring event report.

If the monitoring request is for a group of UEs, the monitoring request further includes a GPSI. The monitoring event report is a latest event reporting notification in a withheld event reporting notification list, in other words, the latest event reporting notification includes latest location information of the UE, namely, current location information of the UE.

If the AMF 1 receives the last location info from the AMF 2, the AMF 1 determines whether the location change occurs based on the last location info and the current location information of the UE.

Because the UE moves from the AMF 2 back to the AMF 1, the Last Location Info may carry location information previously reported by the AMF 1 to an SCEF. Therefore, the current location information of the UE may be the same as the Last location Info. In this case, when the first timer expires, AMF 1 skips sending the location reporting notification to the UE.

If the last location info carries location information reported by the AMF 2 to the NEF, the current location information of the UE is different from the last location info. In this case, when the first timer expires, the AMF 1 sends the location reporting notification of the UE.

Step 1217: The NEF sends the monitoring indication, for example, the Namf_EventExposure_Notify request message, to the SCS/AS, and the NEF returns the response message, for example, the Namf_EventExposure_Notify response message.

The monitoring indication carries at least an SCS/AS event notification endpoint and the location reporting notification.

If the monitoring request is for a group of UEs, the monitoring request further includes the GPSI.

A process in which UE moves from an MME/SGSN on a 4G network to the AMF on a 5G network is similar, and details are not described again.

Figure 13:
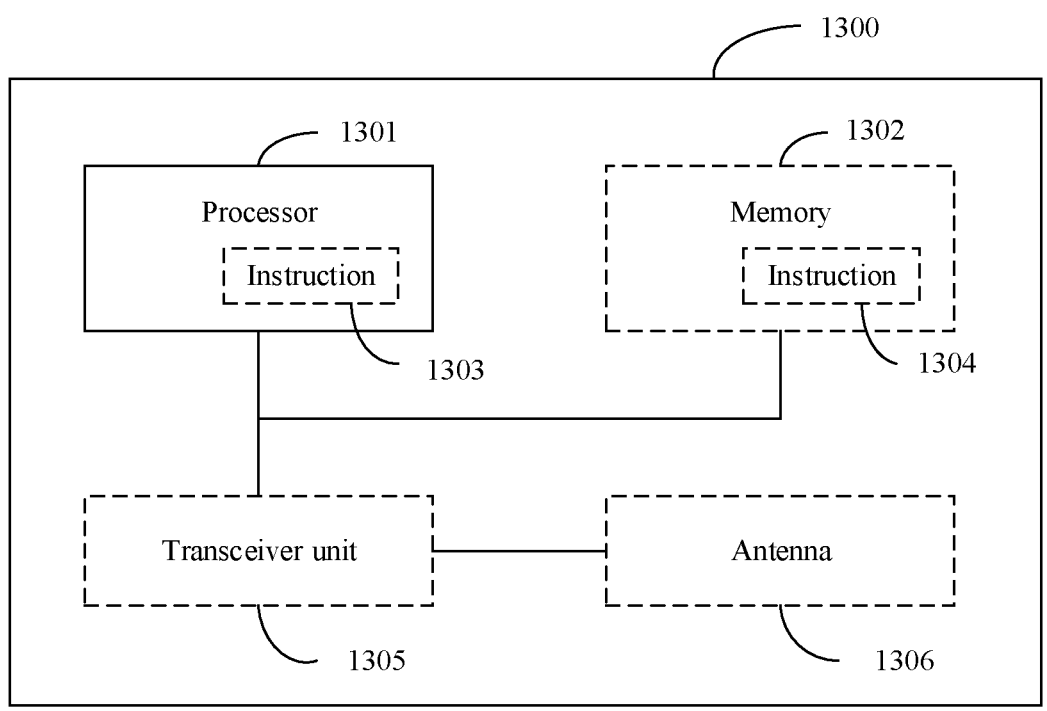
FIG. 13 is a structural diagram of an event monitoring apparatus applicable to an embodiment of this application.

The foregoing describes in detail the event monitoring method in the embodiments of this application with reference to FIG. 7 to FIG. 12A and FIG. 12B. Based on a same inventive concept as the foregoing event monitoring method, as shown in FIG. 13, an embodiment of this application further provides a schematic diagram of a structure of an event monitoring apparatus 1300. The apparatus 1300 may be configured to implement the method described in the foregoing method embodiments applied to the mobility management network element. Refer to the description in the foregoing method embodiments. The mobility management network element includes a first mobility management network element or a second mobility management network element. The apparatus 1300 may be located in a mobility management network element or may be a mobility management network element.

The apparatus 1300 includes one or more processors 1301. The processor 1301 may be a general-purpose processor, a dedicated processor, or the like. For example, the processor 1301 may be a baseband processor or a central processing unit. The baseband processor may be configured to process a communications protocol and communications data. The central processing unit may be configured to: control a communications apparatus (for example, a base station, a terminal, or a chip), execute a software program, and process data of the software program. The communications apparatus may include a transceiver unit, configured to input (receive) and output (send) a signal. For example, the transceiver unit may be a transceiver, a radio frequency chip, or the like.

The apparatus 1300 includes the one or more processors 1301. The one or more processors 1301 may implement the method of the mobility management network element in the foregoing embodiments.

Optionally, the processor 1301 may further implement another function in addition to the method in the foregoing embodiments.

Optionally, in a design, the processor 1301 may execute an instruction, so that the communications apparatus 1300 performs the methods described in the foregoing method embodiments. All or a part of the instructions, for example, an instruction 1303, may be stored in the processor, or all or a part of the instructions, for example, an instruction 1304, may be stored in a memory 1302 coupled to the processor. Alternatively, the apparatus 1300 may be enabled, by using both the instruction 1303 and the instruction 1304, to perform the methods described in the foregoing method embodiments.

In another possible design, the communications apparatus 1300 may also include a circuit, and the circuit may implement a function of the mobility management network element in the foregoing method embodiments.

In another possible design, the apparatus 1300 may include one or more memories 1302, where the memory 1302 stores an instruction 1304, and the instruction may be run on the processor, so that the apparatus 1300 performs the method described in the foregoing method embodiments. Optionally, the memory may also store data. Optionally, the processor may also store an instruction and/or data. For example, the one or more memories 1302 may store the correspondence described in the foregoing embodiments, or the related parameter or the table provided in the foregoing embodiments. The processor and the memory may be disposed separately, or may be integrated together.

In another possible design, the apparatus 1300 may further include a transceiver unit 1305 and an antenna 1306. The processor 1301 may be referred to as a processing unit, and controls an apparatus (a terminal or a base station). The transceiver unit 1305 may be referred to as a transceiver machine, a transceiver circuit, a transceiver, or the like, and is configured to implement a transceiver function of the apparatus by using the antenna 1306.

It should be noted that, the processor in this embodiment of this application may be an integrated circuit chip, and has a signal processing capability. In an implementation process, the steps in the foregoing method embodiments may be completed through a hardware integrated logical circuit in the processor or an instruction in a form of software. The processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The methods, steps, and logical block diagrams that are disclosed in the embodiments of this application may be implemented or performed. The general-purpose processor may be a microprocessor, or the processor may be any conventional processor or the like. The steps of the method disclosed with reference to the embodiments of this application may be directly executed and completed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor.

It may be understood that the memory in the embodiments of this application may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) that is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

An embodiment of this application further provides a computer-readable medium, where the computer-readable medium stores a computer program. When the computer program is executed by a computer, the event monitoring method described in any one of the foregoing method embodiments applied to the mobility management network element is implemented.

An embodiment of this application further provides a computer program product. When the computer program product is executed by a computer, the event monitoring method described in any one of the foregoing method embodiments applied to the mobility management network element is implemented.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (Digital Video Disc, DVD), a semiconductor medium (for example, a solid state disk (Solid State Disk, SSD)), or the like.

An embodiment of this application further provides a processing apparatus, including a processor and an interface. The processor is configured to perform the event monitoring method described in any one of the foregoing method embodiments applied to the mobility management network element.

It should be understood that the processing apparatus may be a chip, and the processor may be implemented by hardware or software. When the processor is implemented by the hardware, the processor may be a logic circuit, an integrated circuit, or the like. When the processor is implemented by the software, the processor may be a general-purpose processor, and is implemented by reading software code stored in a memory. The memory may be integrated into the processor, may be located outside the processor, or may exist independently.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, in the foregoing description, compositions and steps of each example are generally described based on functions. Whether the functions are performed by the hardware or the software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

Based on the foregoing descriptions of the implementations, a person skilled in the art may clearly understand that this application may be implemented by hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another place. The storage medium may be any available medium accessible by a computer. The following provides an example but does not impose a limitation: The computer-readable medium may include a RAM, a ROM, an EEPROM, a CD-ROM, another optical disc storage or disk storage medium or another magnetic storage device, or any other medium that can carry or store expected program code in a form of an instruction or a data structure accessible by a computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination shall also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the principle of this application shall fall within the protection scope of this application.

What is claimed is:

1. A location reporting notification method for a user equipment (UE) moving from a first area served by a first mobility management network element to a second area served by a second mobility management network element, the method being performed by the second mobility management network element and comprising:
receiving a current value of a first location reporting timer regarding the UE from the first mobility management network element, wherein the first location reporting timer is maintained by the first mobility management network element and has a duration of a minimum reporting interval, wherein the minimum reporting interval is a minimum time interval between two adjacent location reporting notifications;
starting a second location reporting timer regarding the UE with the current value of the first location reporting timer from the first mobility management network element; and
upon expiration of the second location reporting timer, sending a suppressed location reporting notification regarding the UE.

2. The method according to claim 1, further comprising:
upon expiration of the second location reporting timer, restarting the second location reporting timer with a duration of the minimum reporting interval.

3. The method according to claim 1, wherein the first mobility management network element or the mobility management network element is a mobility management entity, a serving GPRS support node, or an access and mobility management function network element.

4. The method according to claim 1, further comprising:
before the second location reporting timer expires, suppressing sending of the suppressed location reporting notification regarding the UE.

5. The method according to claim 4, wherein the step of sending the suppressed location reporting notification of the UE comprises:
upon expiration of the second location reporting timer, determining that there is at least one suppressed location reporting notification of the UE;
sending a latest location reporting notification in the at least one suppressed location reporting notification of the UE.

6. A location reporting notification method for a user equipment (UE) moving from a first area served by a first mobility management network element to a second area served by a second mobility management network element, the method comprising:
sending, by the first mobility management network element to the second mobility management network element, a current value of a first location reporting timer regarding the UE, wherein the first location reporting timer is maintained by the first mobility management network element and has a duration of a minimum reporting interval, wherein the minimum reporting interval is a minimum time interval between two adjacent location reporting notifications;
receiving, by the second mobility management network element, the current value of the first location reporting timer;
starting, by the second mobility management network element, a second location reporting timer regarding the UE with the current value of the first timer from the mobility management network element; and
upon expiration of the second location reporting timer, sending, by the second mobility management network element, a suppressed location reporting notification regarding the UE.

7. The method according to claim 6, further comprising:
upon expiration of the second location reporting timer, restarting, by the second mobility management network element, the second location reporting timer with a duration of the minimum reporting interval.

8. The method according to claim 6, wherein the first mobility management network element or the second mobility management network element is a mobility management entity, a serving GPRS support node, or an access and mobility management function network element.

9. The method according to claim 6, further comprising:
before the second location reporting timer expires, suppressing, by the second mobility management network element, sending of the suppressed location reporting notification regarding the UE.

10. The method according to claim 9, wherein the step of sending the suppressed location reporting notification of the UE comprises:

upon expiration of the second location reporting timer, determining that there is at least one suppressed location reporting notification of the UE;

sending a latest location reporting notification in the at least one suppressed location reporting notification of the UE.

11. A second mobility management network element for location monitoring regarding a user equipment (UE) that moves from a first area served by a first mobility management network element to a second area served by the second mobility management network element, the second mobility management network element comprising:

a memory storing executable instructions;

a processor configured to execute the executable instructions to:

receive a current value of a first location reporting timer from the first mobility management network element, wherein the first location reporting timer is maintained by the first mobility management network element and has a duration of a minimum reporting interval, wherein the minimum reporting interval is a minimum time interval between two adjacent location reporting notifications;

start a second location reporting timer regarding the UE with the current value of the first location reporting timer from the first mobility management network element; and upon expiration of the second location reporting timer, send a suppressed location reporting notification regarding the UE.

12. The second mobility management network element according to claim 11, wherein the processor is configured to further execute the executable instructions to:

upon expiration of the second location reporting timer, restart the second location reporting timer with a duration of the minimum reporting interval.

13. The second mobility management network element according to claim 11, wherein the first mobility management network element or the second mobility management network element is a mobility management entity, a serving GPRS support node, or an access and mobility management function network element.

14. The second mobility management network element according to claim 11, wherein the processor is configured to further execute the executable instructions to:

before the second location reporting timer expires, suppress sending of the suppressed location reporting notification regarding the UE.

15. The second mobility management network element according to claim 14, wherein the step of sending the suppressed location reporting notification of the UE comprises:

upon expiration of the second location reporting timer, determining that there is at least one suppressed location reporting notification of the UE;

sending a latest location reporting notification in the at least one suppressed location reporting notification of the UE.

16. A system comprising:

a first mobility management network element serving a first area and maintaining a first location reporting timer for a user equipment (UE) in the first area, wherein the first location reporting timer has a duration of a minimum reporting interval, wherein the minimum reporting interval is a minimum time interval between two adjacent location reporting notifications; and a second mobility management network element serving a second area;

wherein when the UE moves from the first area to the second area, the first mobility management network element is configured to send a current value of the first location reporting timer to the second mobility management network element; and wherein the second mobility management network element is configured to:

receive the current value of the first location reporting timer regarding the UE from the first mobility management network element;

start a second location reporting timer with the current value of the first location reporting timer from the first mobility management network element; and upon expiration of the second location reporting timer, send a suppressed location reporting notification regarding the UE.

17. The system according to claim 16, wherein the second mobility management network element is further configured to:

upon expiration of the second location reporting timer, restart the second location reporting timer with a duration of the minimum reporting interval.

18. The system according to claim 16, wherein the first mobility management network element or the second mobility management network element is a mobility management entity, a serving GPRS support node, or an access and mobility management function network element.

\* \* \* \* \*